US012649885B2

(12) United States Patent
Newman et al.

(10) Patent No.: US 12,649,885 B2
(45) Date of Patent: Jun. 9, 2026

(54) METHOD OF ELIMINATION OF POLY- AND PERFLUOROALKYL SUBSTANCES (PFAS) IN A WASTEWATER BIOSOLIDS GASIFICATION PROCESS USING A THERMAL OXIDIZER AND HYDRATED LIME INJECTION

(71) Applicant: ARIES CLEAN TECHNOLOGIES LLC, Franklin, TN (US)

(72) Inventors: Matthew Newman, Spring Hill, TN (US); Joel Thornton, Nashville, TN (US); Brandon Davis, Murfreesboro, TN (US); Renus Kelfkens, Longmont, CO (US); Ron Hudson, Brentwood, TN (US); Mark Robertson, Longmont, CO (US)

(73) Assignee: ARIES CLEAN TECHNOLOGIES LLC, Franklin, TN (US)

( * ) Notice: Subject to any disclaimer, the term of this patent is extended or adjusted under 35 U.S.C. 154(b) by 692 days.

(21) Appl. No.: 18/127,655

(22) Filed: Mar. 28, 2023

(65) Prior Publication Data

US 2023/0242826 A1      Aug. 3, 2023

Related U.S. Application Data

(63) Continuation-in-part of application No. 17/727,747, filed on Apr. 23, 2022, now Pat. No. 11,639,478,
(Continued)

(51) Int. Cl.
*C10J 3/84*          (2006.01)
*B01D 46/00*          (2022.01)
(Continued)

(52) U.S. Cl.
CPC ................ *C10J 3/84* (2013.01); *B01D 53/48* (2013.01); *B01D 53/78* (2013.01); *B01D 46/00* (2013.01);
(Continued)

(58) Field of Classification Search
CPC .................. C10J 3/84; C10J 2300/0916; C10J 2300/0946; C10J 2300/1606; C10J 2300/1884
See application file for complete search history.

(56) References Cited

U.S. PATENT DOCUMENTS 4,064,219 A * 12/1977 Yamashita ........... B01D 53/501
                                          423/243.02
6,303,083 B1 * 10/2001 Johnson ............... B01D 53/501
                                          422/171
(Continued)

FOREIGN PATENT DOCUMENTS

CN          107353936 A * 11/2017 ................ C10J 3/86
KR      20230071804 A * 5/2023 ............... C10K 3/02

*Primary Examiner* — Imran Akram

(57) ABSTRACT

Apparatus and methods to eliminate PFAS from wastewater biosolids through fluidized bed gasification. The gasifier decomposes the PFAS in the biosolids at temperatures of 900-1800° F. Syngas exits the gasifier which is coupled to a thermal oxidizer and combusts at temperatures of 1600-2600° F. This decomposes PFAS in the syngas and creates flue gas. Heat is recovered from the flue gas by cooling the flue gas to temperatures of 400-1200° F. in a heat exchanger coupled with the thermal oxidizer. Various methods inject moisture into the gas stream, controlling temperature through evaporative cooling and/or injecting chemicals that react with gas stream components. Cooled flue gas mixes with hydrated lime capturing decomposed PFAS molecules with spent lime filtered from the cooled flue gas using a filter system that may incorporate catalyst impregnated filter
(Continued)

elements, eliminating PFAS from wastewater biosolids and controlling emissions in the resulting flue gas.

21 Claims, 11 Drawing Sheets

Related U.S. Application Data which is a continuation of application No. 17/406, 188, filed on Aug. 19, 2021, now Pat. No. 11,339,337.

(51) Int. Cl.
  B01D 53/48          (2006.01)
  B01D 53/78          (2006.01)
(52) U.S. Cl.
  CPC .................. *C10J 2300/1606* (2013.01); *C10J 2300/1618* (2013.01)

(56)               References Cited

U.S. PATENT DOCUMENTS 6,837,910 B1 *  1/2005  Yoshikawa ............... C01B 3/36
                                                48/197 FM

| | | | | |
|---|---|---|---|---|
| 2005/0274307 A1 * | 12/2005 | Lissianski | ................. | F23D 1/00 |
| | | | | 110/345 |
| 2009/0020052 A1 * | 1/2009 | Becchetti | ................... | C10J 3/66 |
| | | | | 110/255 |
| 2010/0096594 A1 * | 4/2010 | Dahlin | ................... | B01D 53/10 |
| | | | | 252/372 |
| 2013/0011326 A1 * | 1/2013 | Grover | ..................... | C10K 1/30 |
| | | | | 423/437.1 |
| 2013/0104519 A1 * | 5/2013 | Zhang | ................ | B01D 53/8631 |
| | | | | 137/561 A |
| 2013/0137151 A1 * | 5/2013 | Tobey | ................... | C12M 45/06 |
| | | | | 252/373 |
| 2013/0192128 A1 * | 8/2013 | Bai | ........................... | C10L 9/10 |
| | | | | 44/589 |
| 2013/0230815 A1 * | 9/2013 | Ger | ......................... | C02F 11/10 |
| | | | | 432/75 |
| 2014/0369908 A1 * | 12/2014 | Reardon | ............... | B01D 53/83 |
| | | | | 423/210 |
| 2016/0194567 A1 * | 7/2016 | Wilson | ..................... | C04B 7/02 |
| | | | | 422/187 |
| 2017/0130140 A1 * | 5/2017 | Bhanuprasad | ........... | C10G 9/32 |
| 2019/0178153 A1 * | 6/2019 | Terho | ......................... | C10J 3/84 |
| 2020/0095898 A1 * | 3/2020 | Hossain | ................... | F02C 6/18 |
| 2021/0032552 A1 * | 2/2021 | Mooney | ..................... | C10J 3/46 |

* cited by examiner

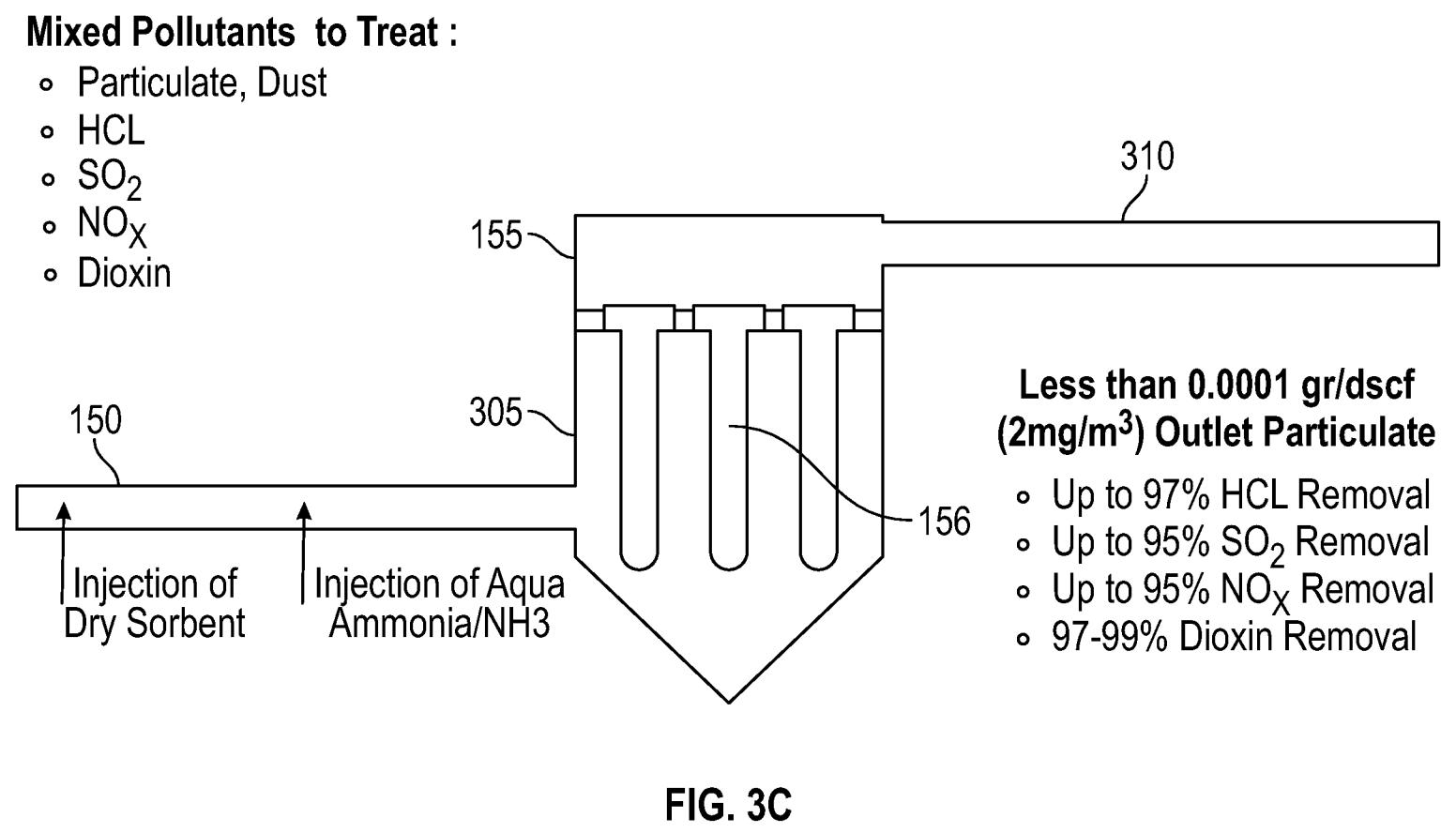

310

Mixed Pollutants to Treat :
- Particulate, Dust
- HCL
- $SO_2$
- $NO_X$
- Dioxin

155

305

156

Less than 0.0001 gr/dscf (2mg/m$^3$) Outlet Particulate
- Up to 97% HCL Removal
- Up to 95% $SO_2$ Removal
- Up to 95% $NO_X$ Removal
- 97-99% Dioxin Removal

150

Injection of Dry Sorbent

Injection of Aqua Ammonia/NH3

FIG. 3C

METHOD OF ELIMINATION OF POLY- AND PERFLUOROALKYL SUBSTANCES (PFAS) IN A WASTEWATER BIOSOLIDS GASIFICATION PROCESS USING A THERMAL OXIDIZER AND HYDRATED LIME INJECTION

CROSS REFERENCE TO RELATED APPLICATION(S)

This application is a Continuation-in-Part of the U.S. application Ser. No. 17/727,747 filed Apr. 23, 2022, which is a Continuation of U.S. application Ser. No. 17/406,188 filed Aug. 19, 2021, which is incorporated herein by reference.

TECHNICAL FIELD

This disclosure relates generally to wastewater biosolids gasification and elimination of poly- and perfluoroalkyl substances.

BACKGROUND

Poly- and perfluoroalkyl substances (PFAS) are a class of chemicals that have found wide use in products such as non-stick coatings for cookware, water and stain repelling additives in clothing, and firefighting foams. These chemicals are extremely stable, and do not biodegrade, giving them the nickname of "forever chemicals." In recent years, these chemicals have been found to present significant health concerns; and the presence of PFAS in the discharge from wastewater treatment plants is becoming an increasing environmental concern.

There are limited processes available to decrease PFAS in wastewater biosolids. Most techniques used to decrease PFAS in wastewater biosolids are inefficient achieving only partial decomposition and/or producing other harmful byproducts. Until now, the most promising methods used to decrease PFAS in biosolids include incineration and pyrolysis.

While incineration has been a somewhat effective solution to decreasing PFAS in biosolids, it requires high temperatures for an extended residence time. Some incineration processes lack the combined temperature and residence time to completely decompose some of the more stable PFA compounds. Incineration also produces pollutants, such as furans and dioxins. In addition, incineration may require expensive pollution control systems and be difficult to permit in some locations.

Pyrolysis, on the other hand, is a process that follows similar principles to gasification. For example, gasification may include a pyrolysis step. In pyrolysis, the feedstock may be heated sufficiently to drive off the volatile compounds, and to break or "crack" these volatile compounds into smaller molecules. What is needed is an apparatus and method of feedstock gasification in which the feedstock may be treated with additional heat to drive off not just the volatile compounds, but also to react much of the non-volatile carbon molecules in the feedstock into a fuel gas in order to eliminate PFAS and control emissions.

SUMMARY

What is disclosed is an apparatus and method to eliminate PFAS from wastewater biosolids through fluidized bed (FB) gasification. In one embodiment, the biosolids are fed into a fluidized bed gasifier. The gasifier decomposes the PFAS in the biosolids at temperatures of 900-1800° F. Synthesis gas (syngas) exits the gasifier and enters a thermal oxidizer coupled to the gasifier where it is combusted at temperatures of 1600-2600° F. This decomposes PFAS in the syngas and creates flue gas. Heat can be recovered from the flue gas by cooling the flue gas to temperatures of 400-1200° F. in a heat exchanger that is coupled to the thermal oxidizer. Cooled flue gas is mixed with hydrated lime, enhancing PFAS decomposition, with the spent lime filtered from the cooled flue gas using a filter system that may incorporate catalyst impregnated filter elements. The apparatus and method thereby eliminate PFAS from wastewater biosolids and control emissions in the resulting flue gas.

A moisture injector operably couples to a gas stream exiting the heat exchanger to inject a moisture into the cooled flue gas stream, wherein the temperature to the filter element is controlled through evaporative cooling. An ammonia injector operably couples to the gas stream exiting the heat exchanger to inject ammonia into the cooled flue gas stream, wherein the ammonia is configured to react with a plurality of substances. A sorbent injector operably couples to the stream exiting the heat exchanger to inject a sorbent into the cooled flue gas stream wherein the sorbent is configured to react with a second plurality of substances and a filter unit operably coupled to the heat exchanger to filter the cooled flue gas stream exiting the heat exchanger. The cooled flue gas reacts with the three injections enhancing PFAS decomposition.

BRIEF DESCRIPTION OF THE DRAWINGS

FIGS. 3A-3C depict various exemplary filter system implementations.

Like reference symbols in the various drawings indicate like elements.

DETAILED DESCRIPTION

Figure 1:
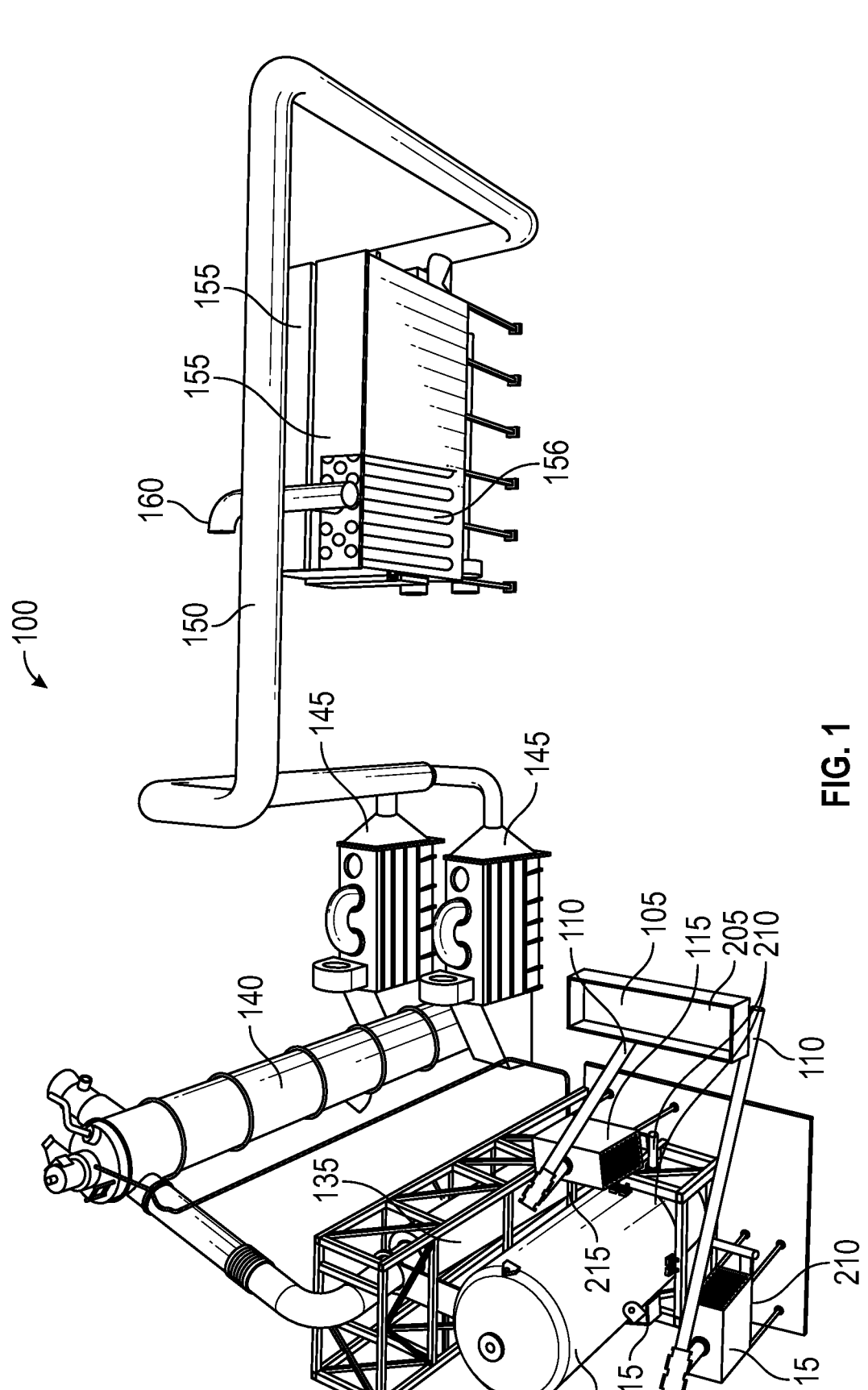
FIG. 1 shows an exemplary apparatus for eliminating PFAS from wastewater biosolids using a fluidized bed gasifier.

In one embodiment, using a FB gasifier, an oxidant is blown through a bed of solid particles at a sufficient velocity to keep the solid particles in a state of suspension. The feedstock is introduced to the gasifier, very quickly mixed with the bed material and almost instantaneously heated to the bed temperature either externally or using a heat transfer medium. Most fluidized-bed gasifiers are equipped with a cyclone in order to minimize char or ash byproduct (that may be carried into the producer gas stream) and remove fluidizing media from the producer gas. In an illustrative example, if a byproduct is predominantly mineral matter and low in carbon (for example, less than 12% carbon), such as from biosolids, the byproduct is more accurately designated ash. A byproduct that is high in carbon (for example, greater than 85% carbon) is more accurately called char, or biochar. The level of carbon is determined by conversion and ash content. The major advantages of using a FB gasifier include feedstock flexibility and the ability to easily control the reaction temperature, which allows for gasification of fine-grained materials (sawdust, etc.) without the need of pre-processing. Fluidized-bed gasifiers also scale very well to large sizes.

A brief fluidized bed (FB) gasification description and a simple example of fluidized bed gasifiers is provided below. Other types of gasifiers, such as downdraft, may also be used. Exemplary downdraft gasification may be implemented using downdraft gasification techniques disclosed with reference to FIGS. 1-21 of U.S. Pat. No. 10,662,386 by Kelfkens, et al., filed on Dec. 6, 2019, as U.S. patent application Ser. No. 16/705,837, and entitled "Method for gasifying feedstock with high yield production of biochar," the entire contents of which are herein incorporated by reference. Exemplary fluidized bed gasification may be implemented using fluidized bed gasification techniques disclosed with reference to FIGS. 1-8 of U.S. Pat. No. 10,696,913 by Kelfkens, et al., filed on Dec. 20, 2019, as U.S. patent application Ser. No. 16/723,538, and entitled "Gasification reactor with pipe distributor," the entire contents of which are herein incorporated by reference.

In one embodiment, the apparatus may comprise: a FB gasifier, configured to gasify feedstock and emit syngas produced by gasifying the feedstock; a thermal oxidizer, operably coupled with the gasifier to receive and combust the syngas, and emit heated flue gas; and a heat exchanger, operably coupled with the thermal oxidizer to receive and cool the heated flue gas and emit the cooled flue gas in a gas stream from the heat exchanger.

The feedstock may further comprise wastewater biosolids.

The feedstock may further comprise biosolids.

The biosolids may further comprise PFAS.

The feedstock may further comprise wastewater biosolids comprising PFAS.

The feedstock may further comprise other PFAS containing solids such as, but not limited to, granulated activated carbon, reverse osmosis resins, other sorbents, and automotive shredder residue.

The apparatus may further comprise a conveyor configured to transfer the feedstock to the gasifier via a feed bin configured with a live bottom.

The apparatus may further comprise the gasifier configured to receive feedstock.

The apparatus may further comprise a dryer operably coupled with the gasifier to supply the gasifier with dry feedstock dried by the dryer.

The dryer may be configured to dry feedstock received by the dryer.

The dryer may be coupled to a device to dewater biosolids.

The apparatus may further comprise a dryer operably coupled with the gasifier.

The apparatus may further comprise the gasifier configured to be operated at temperatures of 900-1800° F.

The apparatus may further comprise the gasifier operating at temperatures of 900-1800° F.

The apparatus may further comprise the gasifier configured to be operated to turn the feedstock into a low heating value syngas.

The apparatus may further comprise the gasifier configured to be operated to devolatilize PFAS in the feedstock, liberate PFAS from solids in the feedstock, and decompose the PFAS liberated from the solids.

The apparatus may further comprise a cyclone operably coupled with the gasifier to receive the syngas exiting the gasifier.

The cyclone may further comprise more than one cyclone.

The apparatus may further comprise more than one cyclone operably coupled with the gasifier.

The apparatus may further comprise the cyclone configured to be operated to remove entrained particles from gas retained by the cyclone.

The apparatus may further comprise the cyclone operably coupled with the thermal oxidizer, to supply the thermal oxidizer with the syngas dis-entrained of particulate matter by the cyclone.

The apparatus may further comprise the thermal oxidizer configured to combust the syngas at temperatures of 1600-2600° F.

The apparatus may further comprise the thermal oxidizer combusting the syngas at temperatures of 1600-2600° F.

The apparatus may further comprise the thermal oxidizer configured to combust the syngas for a residence time of 1-5 seconds.

The apparatus may further comprise the thermal oxidizer combusting the syngas for a residence time of 1-5 seconds.

The apparatus may further comprise the thermal oxidizer configured to be operated to thermally decompose PFAS remaining in the syngas after gasification, wherein the thermal oxidizer operating temperature is greater than the gasifier operating temperature.

The apparatus may further comprise the heat exchanger configured to cool the heated flue gas to temperatures of 400-1200° F.

The apparatus may further comprise the heat exchanger configured to recover heat captured based on cooling the heated flue gas exiting the thermal oxidizer and provide the recovered heat to surrounding systems and devices.

The apparatus may further comprise the apparatus configured to inject the cooled flue gas passing through the heat exchanger with hydrated lime or other calcium-based sorbent.

The apparatus may further comprise an exhaust stack operably connected to an induced draft fan and the apparatus may be operably coupled with the exhaust stack to release the cooled flue gas through the exhaust stack.

The apparatus may further comprise one or more heat exchanger configured to recover heat remaining in the cooled flue gas.

The apparatus may further comprise the induced draft fan configured to pull flue gas from the thermal oxidizer and push the flue gas out the exhaust stack.

The apparatus may further comprise a filter operably coupled to the heat exchanger to filter the cooled flue gas stream exiting the heat exchanger. The apparatus may be further configured to periodically clean the filter with a pulse of air directed backwards through the filter relative to the direction of the cooled flue gas stream exiting the heat exchanger.

The filter may comprise a filter system.

The exhaust stack may be operably coupled to the filter.

The filter system may comprise a plurality of filter units.

The filter may comprise a catalyst impregnated filter element.

In one embodiment, the process may comprise: gasifying feedstock comprising PFAS to produce syngas exiting the gasifier; combusting the syngas in a thermal oxidizer to produce heated flue gas exiting the thermal oxidizer; and cooling the flue gas using a heat exchanger and exiting the cooled flue gas from the thermal oxidizer.

The gasifier may be a fluidized bed gasifier.

Gasifying feedstock may comprise feeding feedstock comprising PFAS into the gasifier.

The feedstock may further comprise wastewater biosolids.

The process may further comprise drying, by a dryer, feedstock comprising wastewater biosolids.

The dryer may be operably coupled with the gasifier to feed feedstock dried by the dryer to the gasifier.

The process may further comprise dewatering, by dewatering equipment, feedstock comprising wastewater biosolids.

The dewatering equipment may be operably coupled with the dryer to feed feedstock from the dewatering equipment to the dryer.

The process may further comprise configuring the gasifier to operate at temperatures of 900-1800° F.

The process may further comprise configuring and operating the gasifier to turn the feedstock into a low heating value synthesis gas.

The process may further comprise removing, by a cyclone, entrained particles from syngas retained by the cyclone.

The cyclone may be operably coupled with the gasifier to receive the syngas exiting the gasifier.

The process may further comprise combusting, by a thermal oxidizer, the syngas received from the gasifier.

The thermal oxidizer may be operably coupled with the gasifier to receive the syngas exiting the gasifier.

The process may further comprise combusting, by a thermal oxidizer, the syngas received from the gasifier.

The thermal oxidizer may be operably coupled with the cyclone to receive the syngas dis-entrained of particulate matter by the cyclone.

The process may further comprise configuring and operating the thermal oxidizer to combust the syngas at temperatures of 1600-2600° F.

The process may further comprise configuring and operating the thermal oxidizer or similar device to combust the syngas at a residence time of 1-5 seconds.

The process may further comprise configuring and operating the thermal oxidizer to thermally decompose PFAS remaining in the syngas after gasification, wherein the thermal oxidizer operating temperature is greater than the gasifier operating temperature.

The process may further comprise cooling, by a heat exchanger operably coupled with the thermal oxidizer, flue gas heated by the syngas combustion in the thermal oxidizer.

The process may further comprise configuring and operating the heat exchanger to cool the heated flue gas to temperatures of 400-1200° F.

The process may further comprise injecting the cooled flue gas passing through the heat exchanger with hydrated lime or other calcium-based sorbent.

The process may further comprise filtering, by a filter operably coupled with the heat exchanger, the gas stream exiting the heat exchanger.

The filter may comprise a catalytically impregnated filter element such as but not limited to a ceramic filter element with catalyst imbedded within the ceramic material.

The process may further comprise configuring and operating the filter to remove spent lime from the gas stream exiting the heat exchanger.

The process may further comprise periodically cleaning the filter with a pulse of air directed backwards through the filter relative to the direction of the gas stream exiting the heat exchanger.

The process may further comprise filtering the lime out of the flue gas and releasing, by an exhaust stack operably coupled with the heat exchanger, the filtered cooled flue gas.

The process may further comprise configuring piping, ducts, pumps, valves, conduit, sensors, and wiring to implement, by an algorithmic controller, the described steps.

In one embodiment, an exemplary process may comprise recovering heat from flue gas heated by combustion of syngas produced from gasified biosolids comprising PFAS.

In one embodiment, an exemplary process may comprise recovering heat, by a heat exchanger, from flue gas heated by combustion of synthesis gas, in a thermal oxidizer, wherein the syngas is produced from biosolids comprising PFAS gasified by a gasifier.

In one embodiment, an exemplary process may comprise: producing syngas by gasifying biosolids comprising PFAS; combusting the syngas to obtain heated flue gas; and recovering heat based on cooling the heated flue gas.

In one embodiment, an exemplary process may comprise: producing producer gas based on gasifying biosolids comprising PFAS; combusting the producer gas to obtain heated flue gas; and recovering heat based on cooling the heated flue gas.

The details of various aspects are set forth in the accompanying drawings and the description below. Other features and advantages will be apparent from the description and drawings, and from the claims.

The present disclosure teaches PFAS elimination from wastewater biosolids. An exemplary PFAS elimination implementation in accordance with the present disclosure may eliminate PFAS in biosolids and other feedstocks by combining the principals of gasification, combustion, and reactions with lime. In an illustrative example, an exemplary gasification step may include feeding PFAS-contaminated feedstock to a gasifier. In some cases, wastewater biosolids may be dewatered and dried to be a suitable fuel to the gasification step of the PFAS processing.

In an illustrative example, the gasifier attacks the PFAS in a method similar to pyrolysis treatment, as pyrolysis may be one step within a gasification process. The operating temperature of the gasifier will both devolatilize the PFAS in the feedstock and thermally decompose the PFAS. In addition to the thermal effects, the strongly reducing atmosphere in the gasifier offers additional pathways to PFAS destruction such as hydrogen cracking and hydrolysis reactions. The more severe conditions required to convert the fixed carbon compounds in the feedstock to a fuel gas, as opposed to simply driving off and cracking the volatiles in pyrolysis, lead to higher rates of devolatilizing and decomposing PFAS compared to pyrolysis alone.

The feed to the gasifier is not limited to wastewater biosolids and may include other PFAS-contaminated substances that could be used as fuel for a gasifier. These other feedstocks include, but are not limited to, spent activated carbon, reverse osmosis resins, and automotive shredder residue. The decomposition reactions in the gasifier may be enhanced by adding or continuously injecting small quantities of lime (up to 5%) separately into to the bed or by mixing it in with the fuel. The lime may be mixed with the fuel prior to being fed into the gasifier, before or after drying, or could have a separate feed system and be fed directly to the bed. The calcium in the lime will react with the fluorine in the PFAS to break down the more stable chain substances to allow for formation of hydrogenated, rather than fluorinated, alkanes which are much less stable and can be more easily decomposed.

Upon exiting the gasifier, the syngas may flow through a cyclone to remove entrained particles from the synthesis gas. The entrained particles are the leftover ash and char from the feedstock with the PFAS having been removed in the gasifier through the gasification process. A cyclone is a control device that uses centrifugal force to separate dust from a gas stream. A cyclone is typically a vertical cylinder with a conical outlet at the bottom. Gas and solids enter tangentially near the top of the cylinder with the dis-entrained solids exiting through the cone at the bottom and the cleaned gas exiting through a vertical pipe in the roof of the cylinder. After the cyclone, the syngas continues to a thermal oxidizer or other device for combusting the synthesis gas.

Removal of entrained particles from the syngas by the cyclone is followed by combustion of the syngas in a thermal oxidizer, which provides much higher temperatures than gasification, operates with excess oxygen, and gives the more stable PFAS compounds sufficient residence time at these higher temperatures to thermally decompose. This step is similar to the incineration process; however, the primary difference is that rather than directly burning the solid feedstock, the thermal oxidizer is only burning the syngas produced by the gasification process. This is not considered to be incineration and this process avoids the negative environmental consequences, such as furan and dioxin formation, that plagues incineration processes. Without the solid fuel present, the thermal oxidizer can be operated at higher temperatures than incineration, greatly enhancing PFAS decomposition rates, without the possibility of slagging the ash in the feedstock.

Exiting the thermal oxidizer, the flue gas passes through a heat exchanger to remove heat to be used elsewhere. The cooled flue gas is then injected with hydrated lime to control the sulfur emissions from the process. After the lime injection, the flue gas flows through a duct to a filter system to remove the spent lime from the gas stream. As the spent lime collects on the surface of the filter, the spent lime collecting on the filter forms a thin layer of spent lime called a filter cake that may periodically be removed by a pulse of air flowing backwards through the filter. The filter elements may be impregnated with catalyst to further enhance decomposition. The gas temperature at this point is in the same range as the low temperature incineration processes enhanced with lime addition. The mixing of any remaining PFAS compounds in the flue gas and passing through the filter cake of lime in the filter device used to remove the spent lime from the gas stream provides a final polishing step whereby the calcium in the lime can attack the fluorine bonds in the PFAS. This reaction is slow and is not expected to contribute significantly to PFAS control but does offer a final polishing step.

Compared to existing PFAS processing technologies, an exemplary PFAS elimination implementation in accordance with the present disclosure may combine multiple pathways for PFAS destruction with the possibility to operate at more severe conditions than existing methods, while avoiding the negative environmental effects of some existing methods.

FIG. 1 depicts an exemplary PFAS elimination implementation configured to recover heat from flue gas heated by combustion of syngas produced from gasified biosolids comprising PFAS, using a fluidized bed gasifier. In FIG. 1, the exemplary PFAS elimination system 100 comprises the gasifier 120, the cyclone 135, the thermal oxidizer 140, and one or more heat exchanger 145. The gasifier 120 depicted in FIG. 1 is a fluidized bed gasifier. As illustrated in FIG. 1, the fluidized bed gasifier 120 is configured to gasify feedstock material 105 fed into the fluidized bed gasifier 120.

In the illustrated example, the feedstock material 105 contains PFAS. In the depicted example, dry biosolids, or other PFAS-containing feedstock material 105, may be stored in the biosolids storage bin 205. In the illustrated example, conveyors 110 may be used to transfer the feedstock material 105 to the gasifier feed bins 115. In the depicted implementation, live bottoms 210 feed the feedstock material 105 from the gasifier feed bins 115 and to feed screws 215 which feed the feedstock material 105 into the fluidized bed gasifier 120.

From the fluidized bed gasifier 120, the syngas flows to the cyclone 135 operably coupled with the fluidized bed gasifier 120. In the cyclone 135, biochar that remains entrained in the syngas after gasification is removed. After the cyclone 135, the syngas is combusted in the thermal oxidizer 140 that is operably coupled with the cyclone 135. Energy from the heated flue gas resulting from the syngas combustion in the thermal oxidizer 140 is removed in the heat exchangers 145 that are operably coupled with the thermal oxidizer 140.

The heat exchangers 145 cool the flue gas heated by the thermal oxidizer 140. Heat recovered by the heat exchangers 145 may be used as heat and/or power in the plant. The feedstock material 105 supplied to the fluidized bed gasifier 120 may be dried by a dryer (described with reference to FIG. 2) operably coupled with the fluidized bed gasifier 120. The dryer may be operably coupled with the heat exchangers 145 and configured to use heat recovered by the heat exchangers 145 to dry the feedstock. In the depicted example, lime is injected into the filter unit duct 150 at the exit from the heat exchanger 145. The spent sorbent is removed in the filter unit 155 and the filtered cooled flue gas released through the exhaust 160. In one embodiment, the apparatus further comprises a filter unit 155 operably coupled to the heat exchanger to filter the cooled flue gas stream exiting the heat exchanger, wherein said filter comprises the catalyst impregnated filter element 156.

Figure 2:
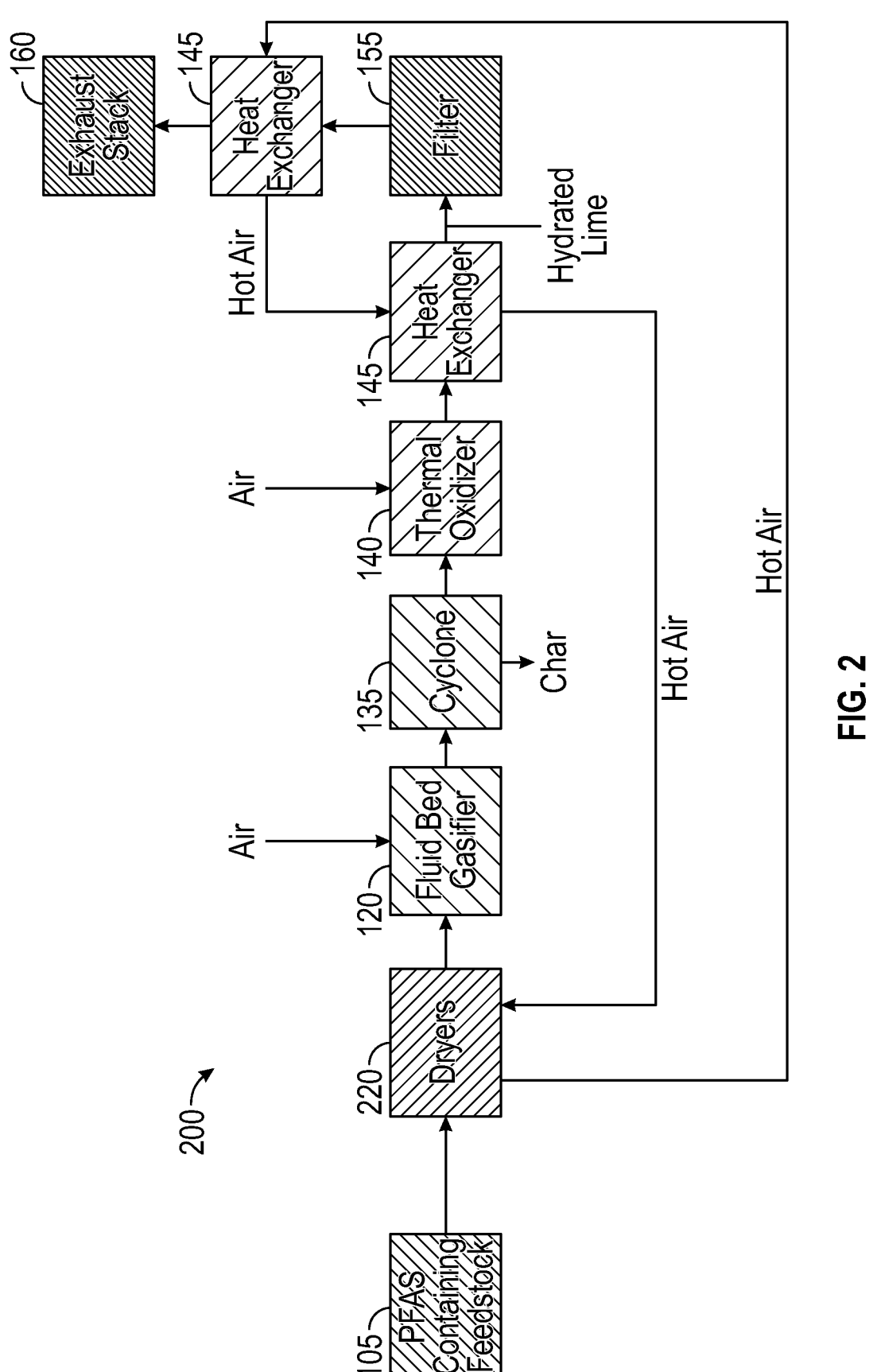
FIG. 2 depicts a process flow of an exemplary apparatus for eliminating PFAS from wastewater biosolids using a fluidized bed gasifier.

FIG. 2 depicts a process flow of an exemplary PFAS elimination implementation configured to recover heat from flue gas heated by combustion of syngas produced from gasified biosolids comprising PFAS, using a fluidized bed gasifier. In FIG. 2, the depicted flow chart of the exemplary process 200 illustrates PFAS elimination using a fluidized bed gasifier 120, a cyclone 135, a thermal oxidizer 140, and a heat exchanger 145. FIG. 2 illustrates a block flow version of the process described with reference to FIG. 1. In the fluidized bed gasifier 120, the PFAS is separated from the PFAS containing feedstock 105 by high temperature and the PFAS is decomposed through various pathways including thermal decomposition.

Particulate matter entrained in the syngas formed in the fluidized bed gasifier 120 is dis-entrained by the cyclone 135 and then combusted in the thermal oxidizer 140 at a higher temperature than the fluidized bed gasifier 120 operating temperature where additional thermal decomposition will take place. The flue gas from the thermal oxidizer 140 is cooled by the heat exchanger 145 and then mixed with hydrated lime. The feedstock material 105 supplied to the fluidized bed gasifier 120 may be dried by dryer 220 operably coupled with the fluidized bed gasifier 120. The dryer 220 may be operably coupled with the heat exchanger 145 and configured to use heat recovered by the heat exchanger 145 to dry the feedstock. The hydrated lime will further decompose any remaining PFAS by chemically attacking the fluorine bonds in the substances.

Figure 3A:
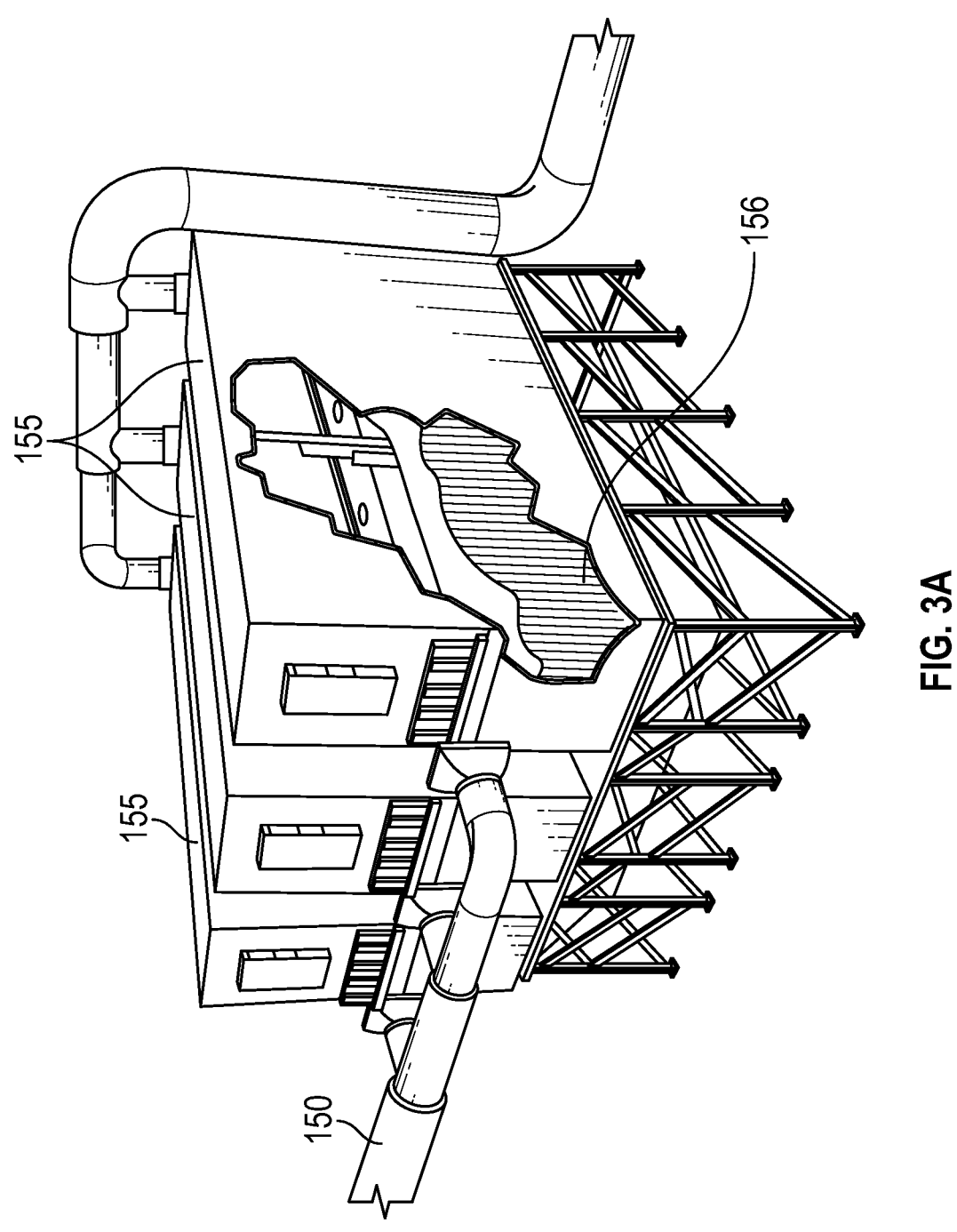
Figure 3B:
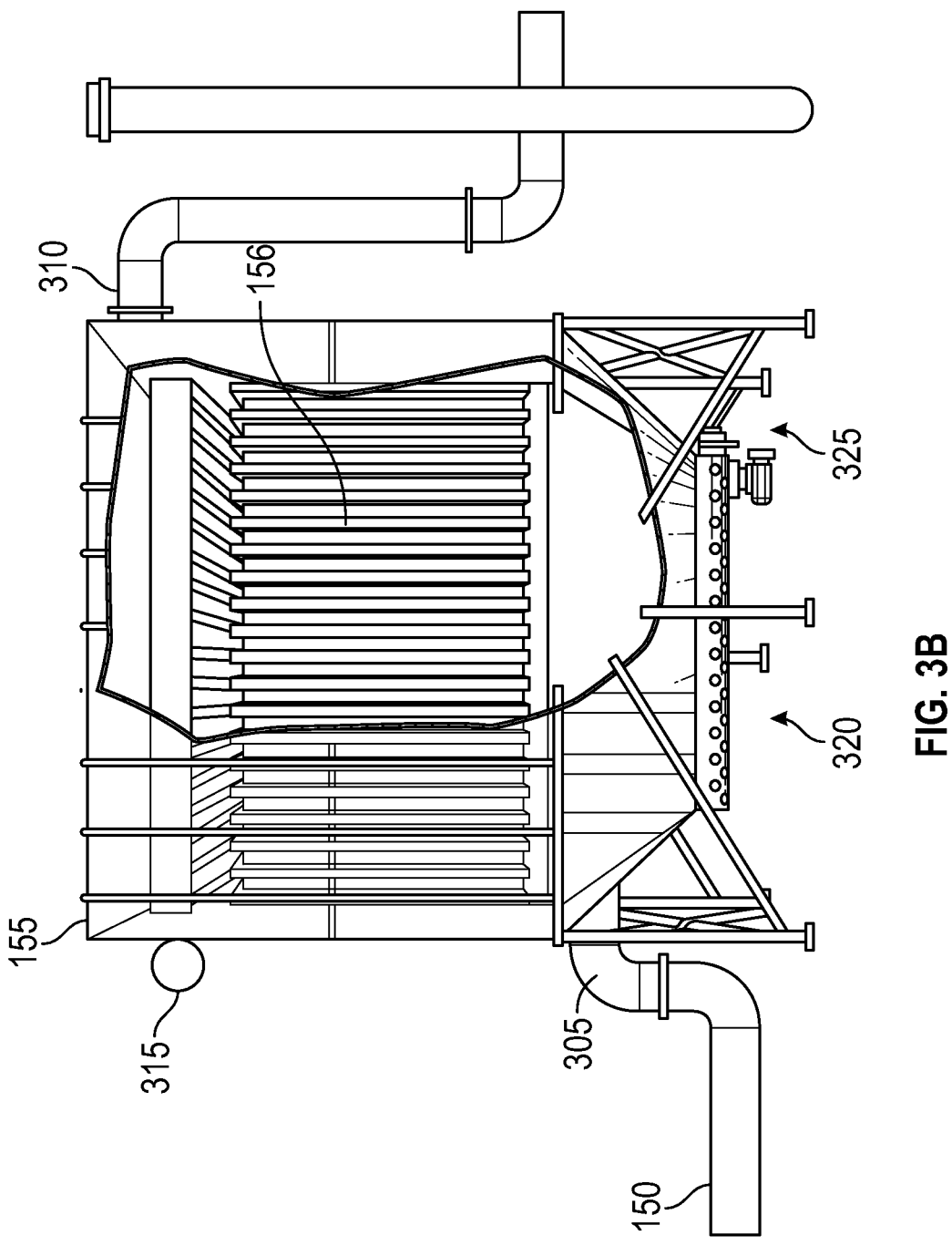

FIGS. 3A-3C depict various exemplary filter system implementations.

In FIG. 3A, the exemplary filter system includes three exemplary filter units 155. In the depicted implementation, each of the three filter units 155 is configured with at least one of the catalyst impregnated filter element 156 visible in an exemplary cut-away view.

In FIG. 3B, the cut-away view of the exemplary filter unit 155 includes the filter unit duct 150 to the filter unit 155. In the depicted example, the filter unit duct 150 is connected to the filter inlet 305. The filter inlet 305 may receive flue gas to be filtered by the filter unit 155 using the catalyst impregnated filter element 156 configured in the filter unit 155. In the illustrated implementation, the filter unit 155 includes the filter outlet 310. In the depicted implementation, the filter outlet 310 is configured to emit flue gas filtered by the filter unit 155. The exemplary filter unit 155 implementation depicted by FIG. 3B also includes the air manifold 315. In an illustrative example, compressed air may be injected into the air manifold 315 for reverse pulse jet cleaning of the filter unit 155. The filter unit 155 may be periodically cleaned with a pulse of air directed backwards through the filter relative to the direction of a cooled flue gas stream entering the filter unit 155 filter inlet 305. In the depicted implementation, the exemplary filter unit 155 includes the waste hopper 320 configured to collect waste expelled from the airlock waste exit 325 by the air injected into the air manifold 315 for cleaning the filter unit 155. In the example depicted by FIG. 3B, the filter unit 155 vessel is illustrated as if cut open to show exemplary filter elements hanging inside the filter unit 155. In the illustrated example, the filter elements are ceramic filter elements. In the depicted implementation, the filter elements are shown within a housing. In some implementations, the depicted filter elements may be approximately 3 inches in diameter. In various implementations, the depicted filter elements may be approximately 2.5 meters long. In an illustrative example, the filter unit 155 depicted by FIG. 3B may be configured with hundreds of the filter elements. The filter elements may be ceramic. The filter elements may hang in the filter unit 155.

FIG. 3C illustrates operational performance of an exemplary filter unit 155. In the depicted example, the filter unit 155 inlet 305 receives a stream comprising flue gas including mixed pollutants through the filter unit duct 150. In the illustrated example, the mixed pollutants further comprise particulates, dust, HCL, $SO_2$, $NO_X$, and Dioxin. In the depicted example, the filter unit 155 filters the flue gas stream using the catalyst impregnated filter element 156. In the illustrated example, the filter unit 155 emits the filtered flue gas stream through the filter unit 155 outlet 310. In the depicted implementation, the filtered flue gas stream emitted by the filter unit 155 outlet 310 comprises less than 0.0001 gr/dscf (2 mg/m$^3$) outlet particulate. In the depicted example, the filter unit 155 performance results in removal of up to 97% HCL, up to 95% $SO_2$, up to 95% $NO_X$, and 97-99% Dioxin.

Figure 4A:
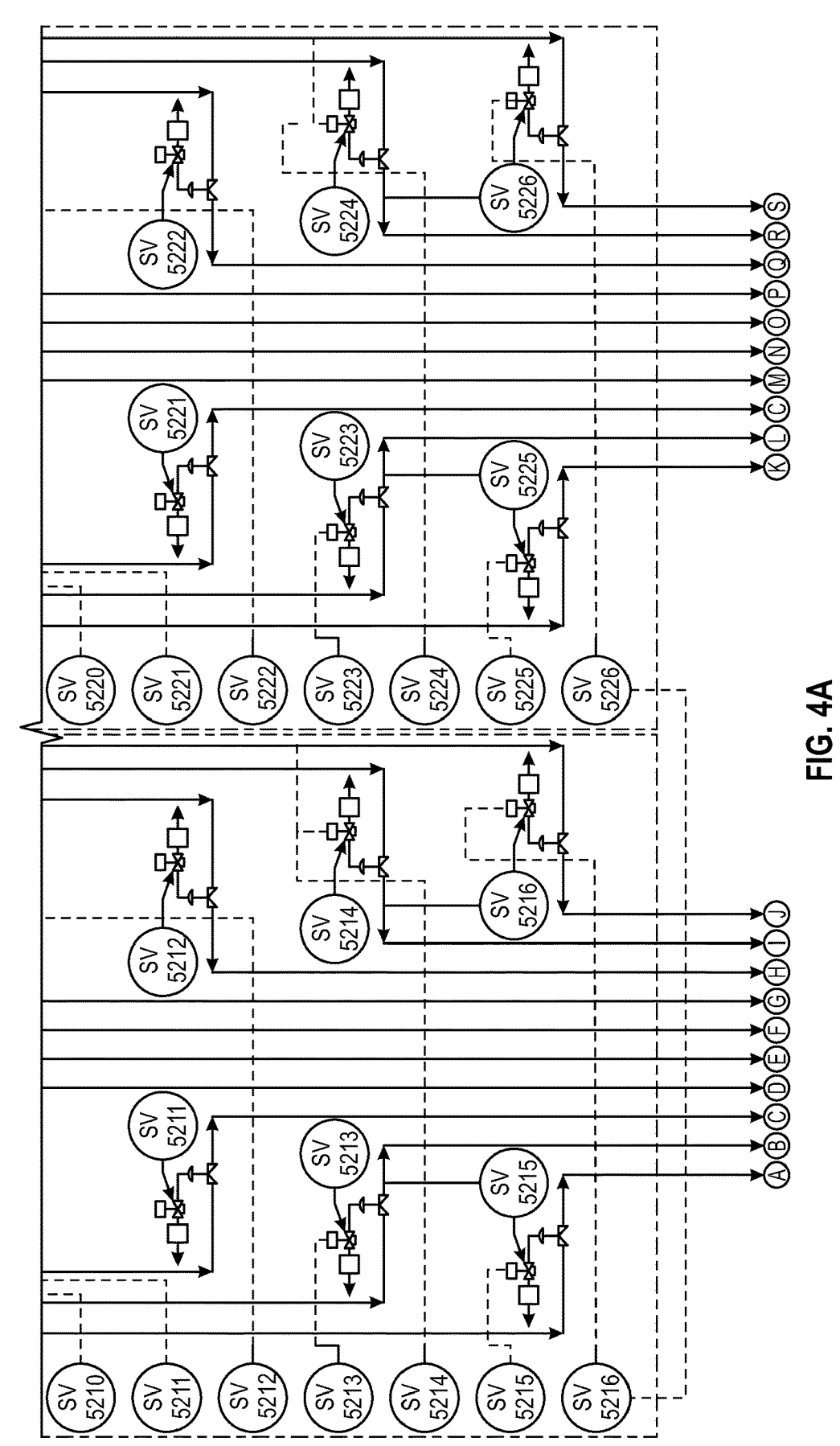
FIGS. 4A-4B together depict a schematic view of an exemplary filter unit.
Figure 4B:
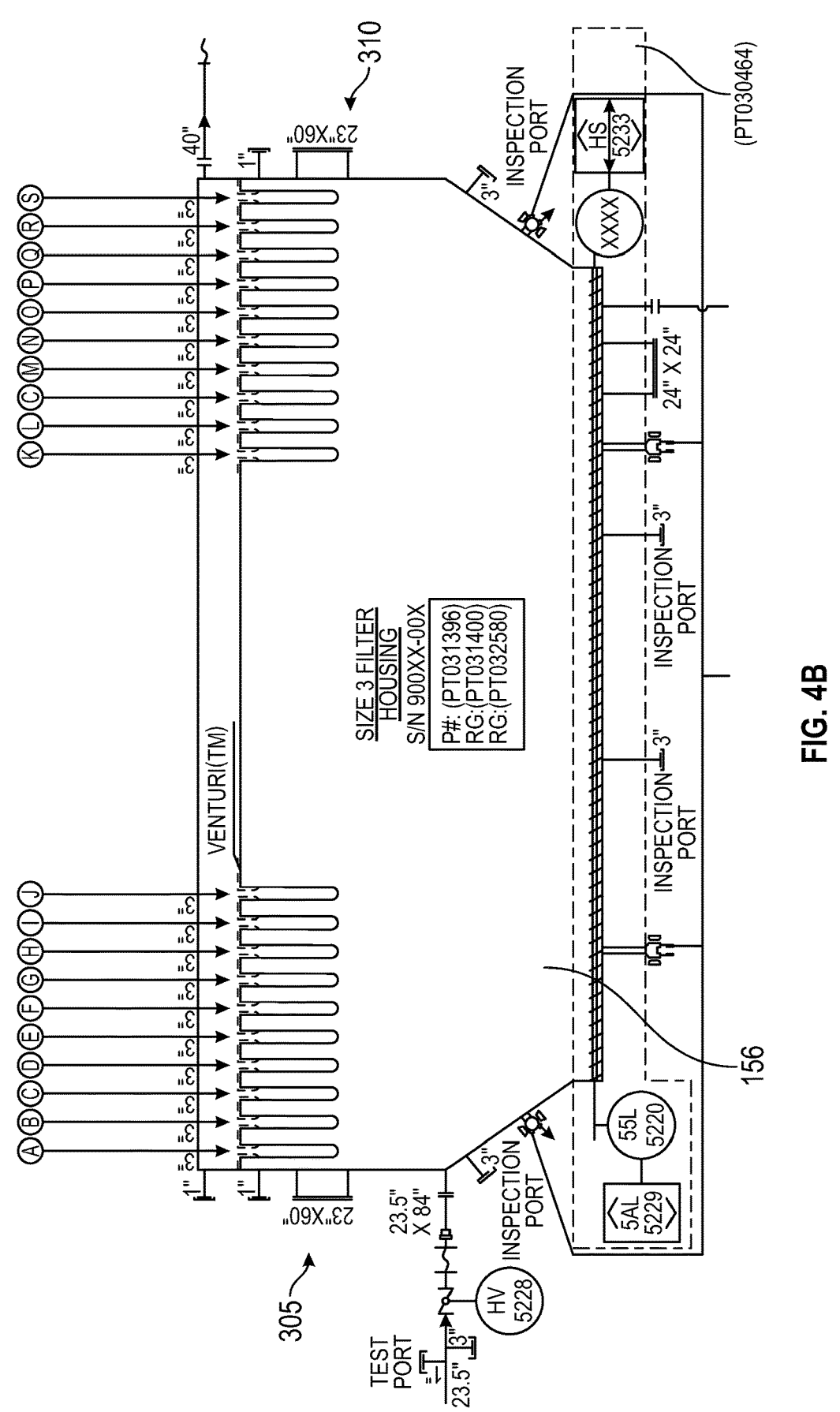

FIGS. 4A-4B together depict a schematic view of an exemplary filter unit. FIG. 4A, depicts various filter unit 155 components in relation to the filter unit 155 housing retaining the filter elements illustrated by FIG. 4B.

In one embodiment, a fluid bed gasifier 120 is configured to ingress PFAS. The PFAS can be a dry solid, a gas, or both. A fluid bed gasifier 120 converts the PFAS into a producer gas and syngas containing chars as a byproduct. The gasifier is provided a carbonaceous feedstock comprising carbon, carbon nitrogen, and carbon-sulphur component molecules. Gasifying oxygen sourced from the air with carbon carbonaceous products can cause a multiplicity of reactions. One reaction is hydrogenation breakdown that forming hydrogen, C and CO2. A by-product of the process of gasifying the feedstock solids is a Water Gas Shift reaction to shift water molecules created in the gasification process. More specifically, the water, H2O, combines with C to create hydrogen and CO2. Using the hydrogen now available, reactions with other carbon molecules break up the PFAS bond, especially the stronger bonds. The long chains can have carbon fluoride bonds, which can convert some of the PFAS when there is hydrogen in the system. In some embodiments, the long chains can have carbon bonds of 20 to 30 atoms. As long as there is sufficient hydrogen, the hydrogenation can break up the PFAS.

In one embodiment, the output of the gasifier goes to the cyclone 135, which will ingress the producer gas and syngas. The cyclone provides clean gas to the thermal oxidizer 140, and removes the char. The thermal oxidizer then burns the clean gas similar to an incinerator with partial oxidation. The flue gas in the thermal oxidizer combusts, egressing gases laden with SO2, NO2 and particulates. The thermal oxidizer destroys PFAS. The only molecules remaining convert to sulfur oxide and nitrous oxide. The thermal oxidizer theoretically removes all the PFAS levels down to parts per trillion levels or less.

Synthesis gas (syngas) exits the fluid bed gasifier 120 which couples to a thermal oxidizer 140 and combusts at temperatures of 1600-2600° F. to decompose PFAS in the syngas and creates flue gas. The syngas gas burns in the thermal oxidizer 140 to heat the flue gas going to heat exchangers 145. A heat recovery step using the heat exchangers 145 will increase the temperature of the hot air using a circulation of air through a first heat exchanger operably coupled to the thermal oxidizer. The flue gas can then optionally pass through a second heat exchanger 145 operably coupled between the filter unit 155 and an exhaust 160, where the second heat exchanger 145 provides hot air to increase the heat of the first heat exchanger which is coupling to the thermal oxidizer 140. In one embodiment, the gas stream is cooled using three injectors, which may include (1) a sorbent injector 505C, in some cases using a lime hydrator catalyst, (2) an ammonia injector 505B and/or (3) a moisture injector 505A. The injectors are further described with reference to FIGS. 5 & 6. In one embodiment the moisture injector may use quench water to cool the gas stream.

In one embodiment, the heat exchanger 145 is operably coupled to the filter unit 155 with a duct 150 that has a length sufficient for the moisture injector 505A, ammonia injector 505B, and the sorbent injector 505C to operate. A certain distance is required for the moisture at 615 and the ammonia at 680 to dissipate when it hits hot air before reaching the sorbent injection at 681. Injecting ammonia, acting as reducing agent for selective cracking catalyst impregnated in the filter elements, causes reduction reactions to nitrous oxides and other byproducts that are converted to N2 and H2O. The NOX reduction reaction takes place as the gases pass through the filter element. Before entering the filter, ammonia, is injected and mixed with the gases in the duct as described. The chemical equation for stoichiometric reaction using either anhydrous or aqueous ammonia for a selective catalytic reduction process is 2NO+2: $NH_3+\frac{1}{2}O_2 \rightarrow 2N_2 + 3H2O$ $NO_2+2NH2_3+\frac{1}{2}O_2 \rightarrow \frac{3}{2}N_2 + 3H_2$ So, the duct 150, which can also be a pipe 150 or conduit 150, has a length that must provide residence time for the chemical reactions to start. The length of the pipe after the sorbent injection must also allow sufficient residence time in the duct 150 between the sorbent injection at 681 for sorbent to react before reaching the filter input 620 (depicted by FIG. 6).

The moisture injector position is closest to the heat exchanger. In one embodiment, the duct 150 is 50 or more feet from the ammonia injector 505B to allow enough time for evaporative cooling. The moisture should evaporate completely before it arrives at the sorbent injection point and spray nozzles, not shown in the figures, atomize the moisture to micro water droplets which flash to vapor. When the moisture enters the stream, it becomes super-heated steam, removing moisture droplets in the in the system. Evaporation drops the temperature by adding steam to the flow increases the cubic feet per minute of air flow going through the temperature constant. Likewise, the aqueous ammonia should be in a vapor form before reaching the sorbent injector 505C having dry powder sorbent. In one embodiment, the sorbent injector is 100 feet from the filter unit to allow for residence time. In some designs, the total length of the duct is 200 feet.

In one embodiment, an ammonia solution with 81% water and 19% ammonia can reduce the 800° F. temperature of the gas stream exiting the heat exchanger that flows to the filter for a maximum of 720° F. and preferably 700° F. The ammonia injector 505B uses moisture evaporation as a first control point to lower the temperature of the stream entering the filter. If there is not enough evaporation from the ammonia injection, the system adds a second moisture, the water upstream from the ammonia injector. The water can be called a quench water to quench the heat. The input temperature to the filter unit is a function of upstream temperature control through the heat exchanges. A temperature rise from 720° F. to 800° F. at the filter unit 155 indicates a lessening of the heat exchange capability. According to one embodiment, the system is running out at 720° F. temperature input to the filter unit and the injectors are constantly feeding 50 pounds of ammonia and 200 pounds per hour of sorbent. When the temperature of the stream goes up above 720° F., moisture injectors operate.

Selective catalytic reduction (SCR) is performed on the SO2, NO2 and particulates them in the filter unit 155 to prevent emissions to the atmosphere. The SCR catalyst can be tuned or modified if some PFAS survives by impregnating the ceramic filter with additional catalysts to destroy anything remaining PFAS.

In another embodiment, the filter is a Tri-Mer pollution control unit that is used to handle three emissions, SO2, NO2, and particulates. The sorbent is injected to (1) condition the gas to remove the sulfur SO2 (2) the ammonia combines in the gas stream which is conditioned by nitrous oxides and reacts in a ceramic filter impregnated with a selected catalytic cracking a catalyst, and (3) the moisture is injected using evaporative cooling. In one embodiment, the gas exiting filter unit 155 uses a 32 in pipe or duct connecting to an exhaust to egress to the atmosphere a clean gas without CO2 in the oxygen.

The EC waste unit 510, comprises whatever has bonded with the sorbent. In one embodiment, the hydrated lime injectors (#) tie up sulphur dioxide, SO2, in the gas stream so as to react with sorbent and convert to a solid for disposal using the EC waste. What is removed from the filter to the EC waste is known as Spent Sorbent which is a combination of Spent Sorbent and all the particulates. The system also captures particulates in waste stream air circulation.

Advantages

One advantage of limiting the ammonia to a substantially 19% solution is that a stronger solution overdoses the stream and wastes ammonia. Adding the quench water is a method of lowering the temperature of the stream while gaining the benefits of the ammonia reacting with the PFAS.

A second advantage is that it can be easier to convert some of the PFAS if there is hydrogen in the gasifier system. Otherwise, a separate unit outside the gasifier is required.

Figure 5:
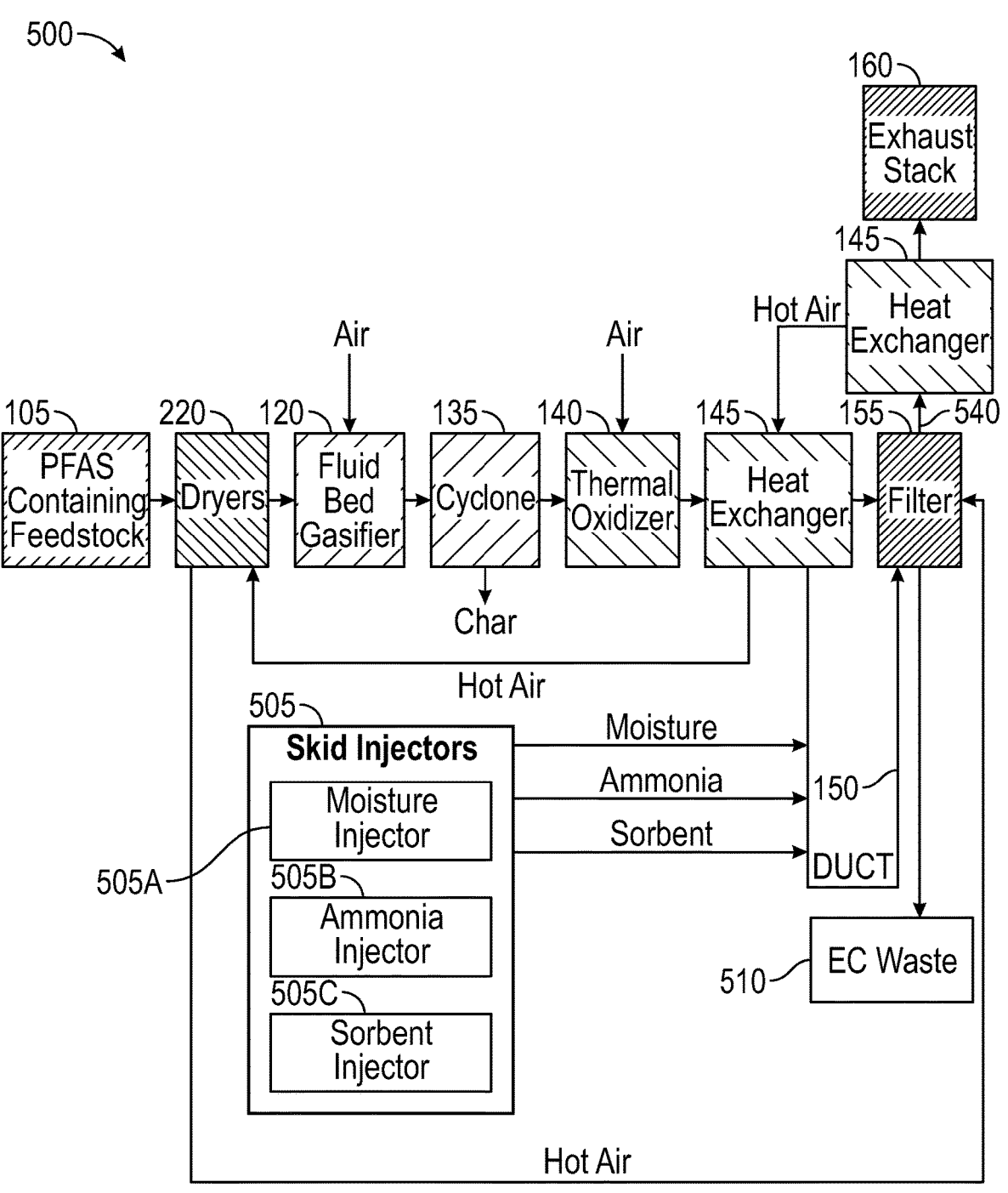
FIG. 5 illustrates a second process flow of an exemplary PFAS elimination implementation.

FIG. 5 illustrates an embodiment of an exemplary block flow version of the process described regarding FIG. 2. The difference between FIG. 2 and FIG. 5 is the point where lime is injected into the filter unit 155. A duct 150 operably connects from the exit of the heat exchanger 145 to the filter unit 155. The duct 150 is a conduit or a pipe for a gas stream flow between the heat exchanger 145 and the filter unit 155. An injector skid block 505 operably couples the following three injectors: (1) moisture injector 505A; ammonia injector 505B; and the sorbent injector 505C to the duct 150. The water moisture injector operably couples to a cooled flue gas stream exiting the heat exchanger 145 at a point before the sorbent injector and at a point before the ammonia injector. The sorbent injector is placed closest to the filter unit 155. An EC waste unit is shown for receiving spent sorbent removed from the filter unit to an EC waste unit (510).

Figure 6:
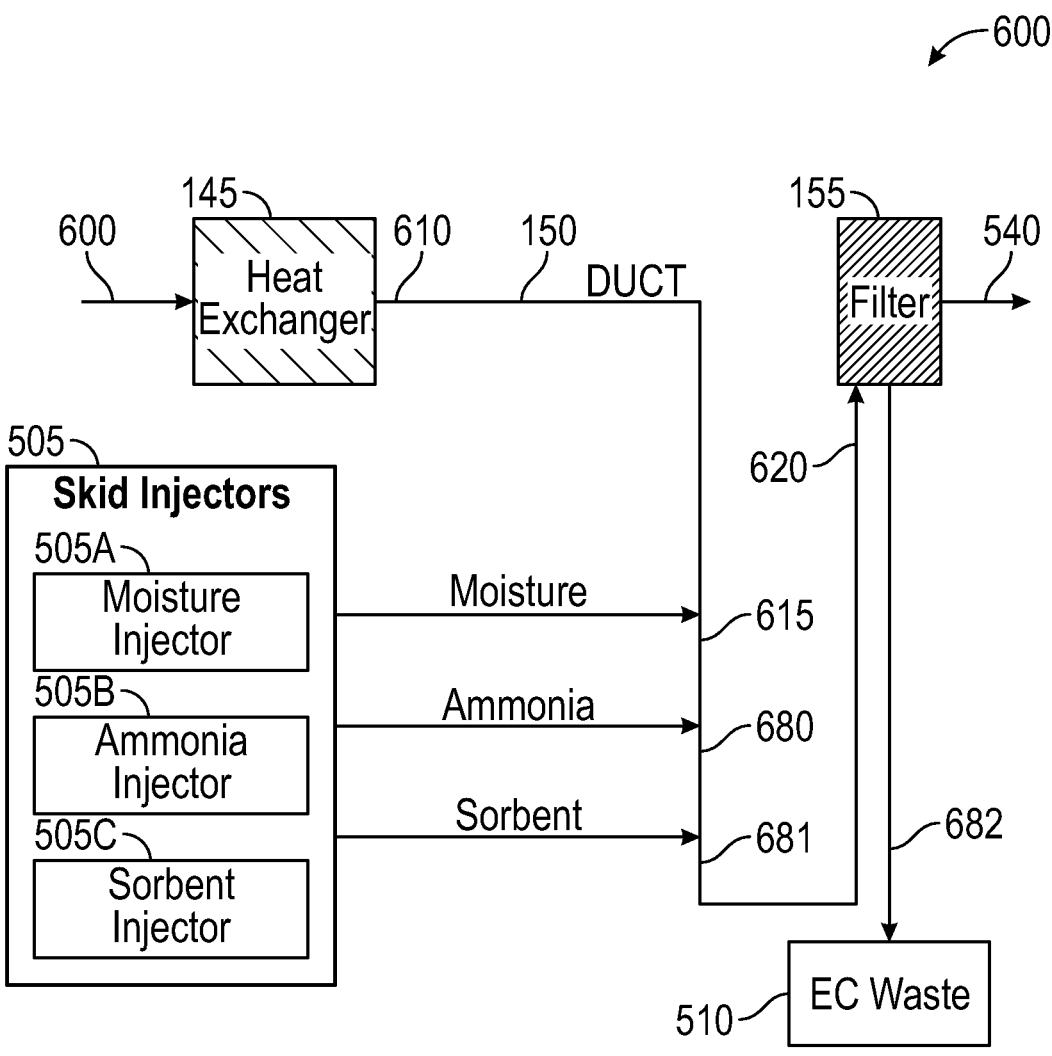
FIG. 6 illustrates the process flow between the heat exchanger and the filter unit.

FIG. 6 illustrates the process flow 600 between the heat exchanger and the filter unit. According to some aspects, the moisture injector operably couples to the gas stream exiting the heat exchanger to inject a moisture into the cooled flue gas stream, wherein the temperature to the filter element is controlled through evaporative cooling. According to one embodiment, an ammonia injector operably couples to the gas stream exiting the heat exchanger to inject ammonia into the cooled flue gas stream, wherein the ammonia is configured to react with a plurality of substances. The sorbent injector operably coupled to the stream exiting the heat exchanger to inject a sorbent into the cooled flue gas stream wherein the sorbent is configured to react with a second plurality of substances, Data for total steam, mass flow, and mass fractions at the points at references 670, 610, 615, 620, 640, 680, 681, and 682 are listed in Tables 1-3.

The moisture injector further comprises spray nozzles operable to atomize the moisture, wherein evaporating the moisture lowers the cooled flue gas stream temperature exiting the heat exchanger. In one embodiment, the moisture is water.

In one embodiment, the ammonia injector operably couples to the cooled flue gas stream exiting the heat exchanger at a point after the moisture injector is spaced sufficiently far from the moisture injector. This allows the moisture to evaporate where the cooled flue gas stream moisture vapors are atomized. In one embodiment, the ammonia injector can use aqueous ammonia for injection. In one embodiment, the aqueous ammonia for injection is substantially a 19% solution. In this embodiment the aqueous ammonia can react with a plurality of substances to combine in the cooled flue gas stream with nitrous oxides to react in the Filter having a ceramic filter, which is impregnated with a selected catalytic cracking catalyst. The sorbent injector operably couples to the cooled flue gas stream exiting the heat exchanger at a point after the ammonia injector and spaced sufficiently to allow the ammonia injector to react with nitric nitrous oxide allowing sufficient residence time for chemical reactions.

In one embodiment, the sorbent injector provides a source of hydrated lime operably coupled to the heat exchanger 145, wherein the hydrated lime is injected into the filter unit at an exit of the heat exchanger 145, wherein reacting with the second plurality of substances is reacting to remove SO2, sulfur dioxide in the filter. In one embodiment, spent lime is removed from the filter unit to an EC waste unit (510) for collecting spent sorbent. In one embodiment, the hydrated lime is a dry powder and the cooled flue gas stream moisture vapors are atomized to have no moisture droplets at the point of the dry powder injection. In one embodiment, a mass flow to the heat exchanger of substantially 92, 125 pounds per hour uses a constant injection of substantially 50 pounds per hour of ammonia and a constant injection of substantially 200 pounds per hour of the sorbent. In one embodiment, the filter is a Tri-Mer unit of the pollution control unit assembled with three components to remove the emissions of NO2, SO2 and particulates. In one embodiment, the apparatus is configured to use lime as filtration aid capture and remove particulates on the filter surface.

Figure 7:
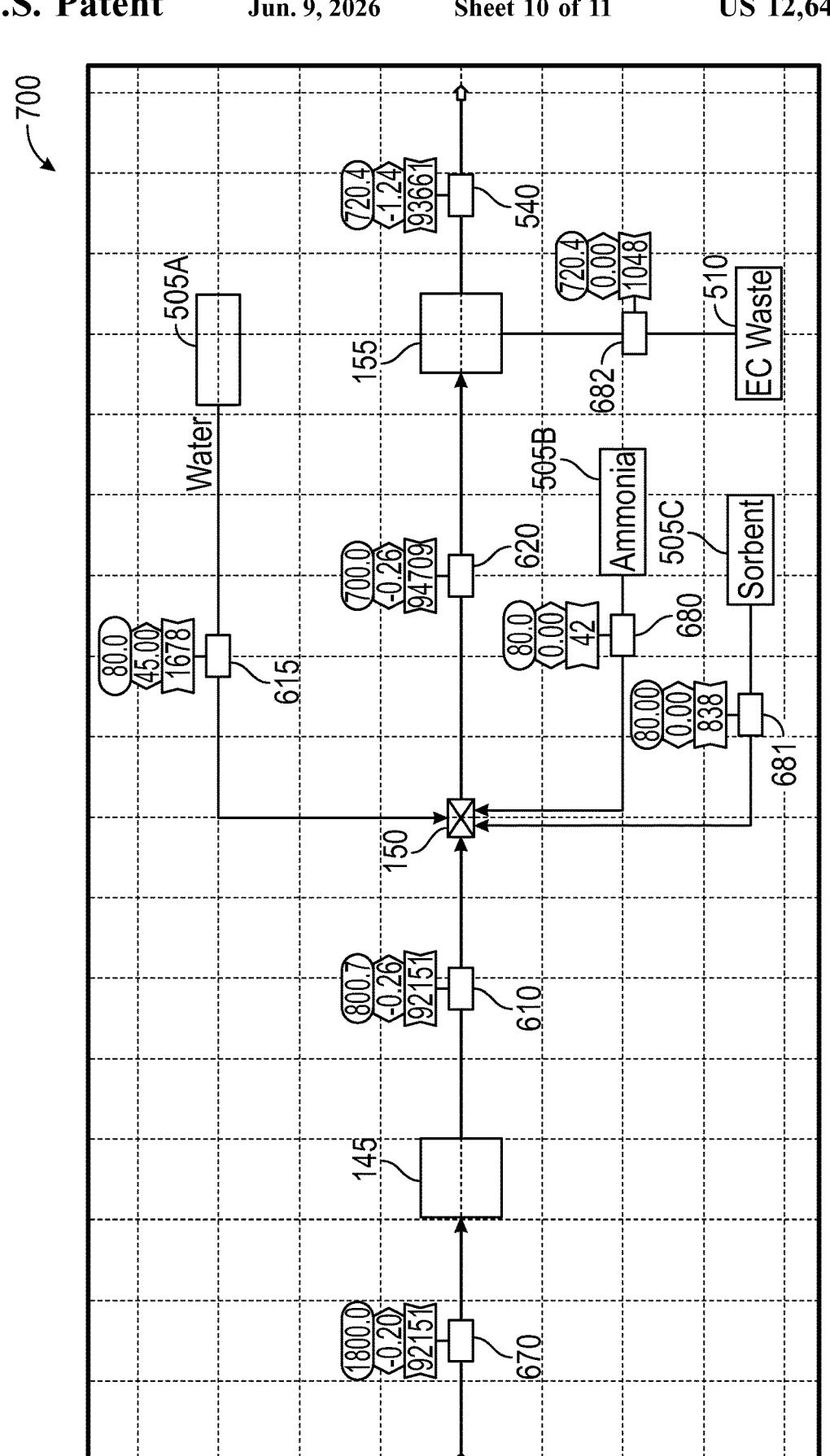
FIG. 7 illustrates a flow diagram between the heat exchanger and the filter unit.

FIG. 7 is a flow diagram 700 showing the duct 150 illustrated as a hub to the three injectors. The hub is illustrative and does not show the positioning of the injectors and the length of the duct 150 between them. The duct 150 symbol merely shows a mixing of injectors within a duct 150. Data points for the references 670, 610, 615, 620, 640,

680, 681, and 682 each include temperature, pressure, and total flow listed in Tables 1-3 below. Definitions for the following references are: 670 is a data point input to the heat exchanger 145; 610 is a data point output from the heat exchanger 145; 615 is a moisture injector data point; 680 is an ammonia injector data point; 681 is the sorbent injector data point; 620 is the data point input to the filter unit 155; 540 is the data point output from the filter unit; and 682 is the Data Point to ES waste.

Figure 8:
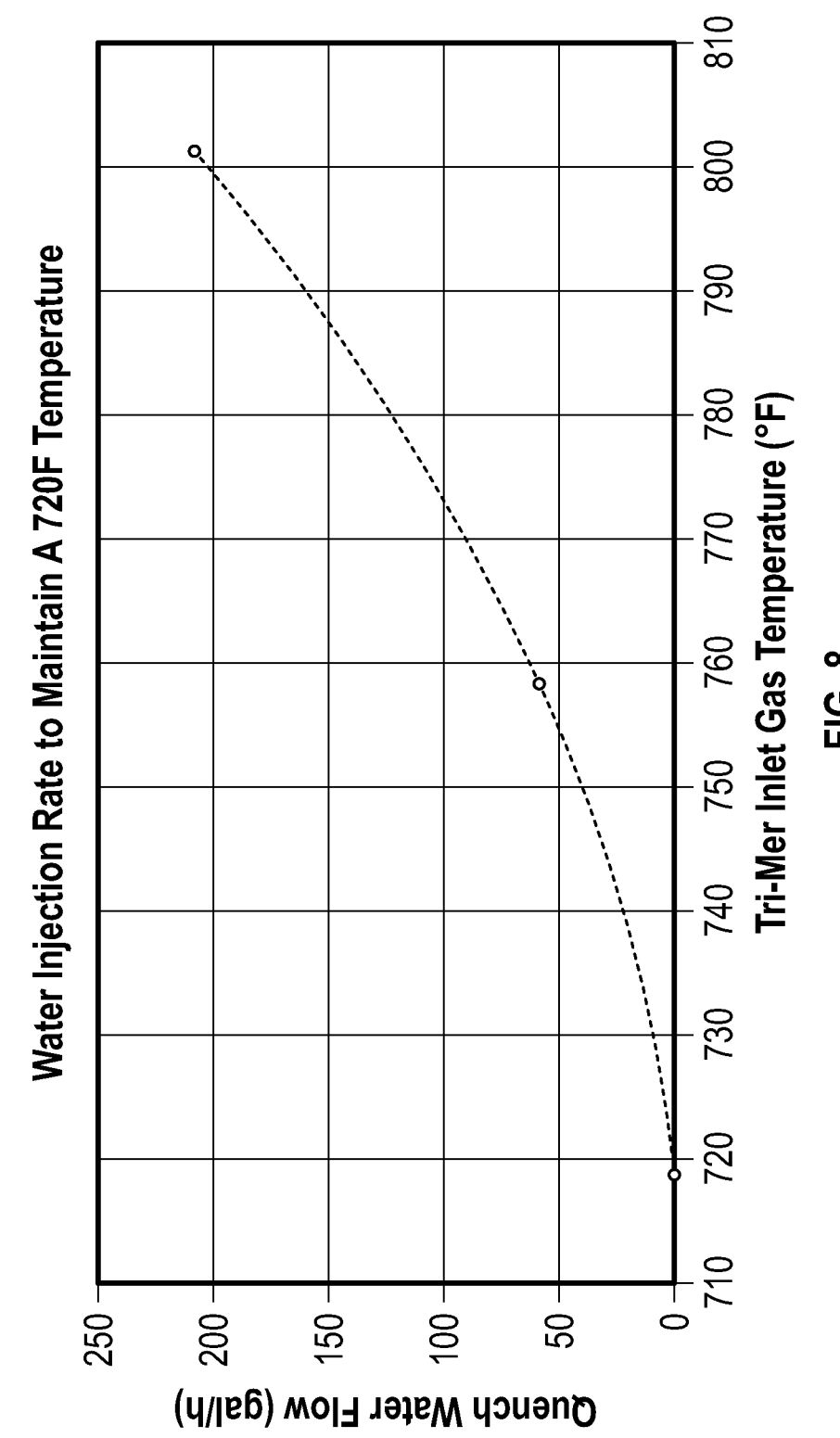
FIG. 8 illustrates a graph showing the water injection rate to maintain a specified temperature input to the filter unit.

FIG. 8 is a graph 800 showing the water injection rate to maintain a specified temperature input to the filter unit of 720° F. The water injection water can be controlled to operate at an input temperature of substantially 720° F. for the gas stream entering the filter unit 155. The graph shows injecting a varying and sufficient amount of water to lower the gas stream temperature until a maximum of substantially 800° F. input temperature to the Filter Unit. For example, at approximately 780° F., the quench water flow rate would be substantially 150 gallons per hour. An operator, or computer-controlled temperature and relay device, may raise and lower the quench water injected. A second example data point is at substantially 773° F. where the quench water flow rate would be substantially 100 gallons per hour. In one embodiment, the graph is created in order to define the controls in the human machine interface (HMI) for the system operator to understand how much quench water to add. In one embodiment, the system is computerized with relays to provide quench water according to the graph.

TABLE 1

| | | | | | Total Steam | | | | |
|---|---|---|---|---|---|---|---|---|---|
| | Units | 670 | 610 | 615 | 620 | 540 | 680 | 681 | 682 |
| Temperature | ° F. | 1,800.00 | 800.61 | 80.00 | 700.00 | 720.45 | 80.00 | 80.00 | 720.45 |
| Pressure | psig | −0.20 | −0.26 | 45.00 | −0.26 | −1.24 | 0.00 | 0.00 | −1.24 |
| Mass Vapor Fraction | | 1.0000 | 1.0000 | 0.0000 | 0.9979 | 1.0000 | 0.0000 | 0.0000 | 0.0000 |
| Mass Liquid Fraction | | 0.0000 | 0.0000 | 1.0000 | 0.0000 | 0.0000 | 1.0000 | 0.0000 | 0.0000 |
| Mass Solid Fraction | | 0.0000 | 0.0000 | 0.0000 | 0.0021 | 0.0000 | 0.0000 | 1.0000 | 1.0000 |
| Mass Enthalpy | Btu/lb | −338.15 | −631.68 | −6,863.39 | −762.00 | −743.50 | −5,927.40 | −5,720.93 | −4,858.95 |
| Mass Density | lb/cuft | 0.02 | 0.03 | 62.06 | 0.03 | 0.03 | 55.16 | 145.15 | 299.98 |
| Enthalpy Flow | MMBtu/hr | −31.15 | −58.19 | −12.10 | −71.73 | −69.68 | −0.30 | −1.14 | −2.06 |
| Volume Flow | cuft/hr | 5,409,162 | 3,031,209 | 28.41 | 2,875,872 | 3,133,718 | 0.91 | 1.38 | 1.41 |

TABLE 2

| | | | | | Mass Flows | | | | |
|---|---|---|---|---|---|---|---|---|---|
| | Units | 670 | 610 | 615 | 620 | 540 | 680 | 681 | 682 |
| Total Flow | lb/hr | 92,125.29 | 92,125.16 | 1,762.77 | 94,137.93 | 93,714.74 | 50.00 | 200.00 | 423.20 |
| H2O | lb/hr | 6,621.32 | 6,621.32 | 1,762.77 | 8,424.59 | 8,397.56 | 40.50 | 0.00 | 0.00 |
| H2 | lb/hr | 0.00 | 0.00 | 0.00 | 0.00 | 0.00 | 0.00 | 0.00 | 0.00 |
| N2 | lb/hr | 64,305.03 | 64,304.93 | 0.00 | 64,304.93 | 64,314.64 | 0.00 | 0.00 | 0.00 |
| O2 | lb/hr | 10,242.48 | 10,242.45 | 0.00 | 10,242.45 | 10,207.76 | 0.00 | 0.00 | 0.00 |
| AR | lb/hr | 1,090.73 | 1,090.73 | 0.00 | 1,090.73 | 1,090.73 | 0.00 | 0.00 | 0.00 |
| CO | lb/hr | 0.00 | 0.00 | 0.00 | 0.00 | 0.00 | 0.00 | 0.00 | 0.00 |
| CO2 | lb/hr | 9,691.03 | 9,691.03 | 0.00 | 9,691.03 | 9,691.03 | 0.00 | 0.00 | 0.00 |
| NH3 | lb/hr | 0.00 | 0.00 | 0.00 | 9.50 | 4.71 | 9.50 | 0.00 | 0.00 |

TABLE 2-continued

|  |  |  |  | Mass Flows |  |  |  |  |  |
|---|---|---|---|---|---|---|---|---|---|
|  | Units | 670 | 610 | 615 | 620 | 540 | 680 | 681 | 682 |
| CHN | lb/hr | 0.00 | 0.00 | 0.00 | 0.00 | 0.00 | 0.00 | 0.00 | 0.00 |
| H2S | lb/hr | 0.00 | 0.00 | 0.00 | 0.00 | 0.00 | 0.00 | 0.00 | 0.00 |
| COS | lb/hr | 0.00 | 0.00 | 0.00 | 0.00 | 0.00 | 0.00 | 0.00 | 0.00 |
| CL2 | lb/hr | 0.00 | 0.00 | 0.00 | 0.00 | 0.00 | 0.00 | 0.00 | 0.00 |
| HCL | lb/hr | 0.00 | 0.00 | 0.00 | 0.00 | 0.00 | 0.00 | 0.00 | 0.00 |
| NO | lb/hr | 20.32 | 20.32 | 0.00 | 20.32 | 8.13 | 0.00 | 0.00 | 0.00 |
| NO2 | lb/hr | 0.27 | 0.27 | 0.00 | 0.27 | 0.03 | 0.00 | 0.00 | 0.00 |
| SO2 | lb/hr | 154.11 | 154.11 | 0.00 | 154.11 | 0.15 | 0.00 | 0.00 | 0.00 |
| CH4 | lb/hr | 0.00 | 0.00 | 0.00 | 0.00 | 0.00 | 0.00 | 0.00 | 0.00 |
| C2H6 | lb/hr | 0.00 | 0.00 | 0.00 | 0.00 | 0.00 | 0.00 | 0.00 | 0.00 |
| C3H8 | lb/hr | 0.00 | 0.00 | 0.00 | 0.00 | 0.00 | 0.00 | 0.00 | 0.00 |
| C4+ | lb/hr | 0.00 | 0.00 | 0.00 | 0.00 | 0.00 | 0.00 | 0.00 | 0.00 |
| THERM-66 | lb/hr | 0.00 | 0.00 | 0.00 | 0.00 | 0.00 | 0.00 | 0.00 | 0.00 |
| C | lb/hr | 0.00 | 0.00 | 0.00 | 0.00 | 0.00 | 0.00 | 0.00 | 0.00 |
| S | lb/hr | 0.00 | 0.00 | 0.00 | 0.00 | 0.00 | 0.00 | 0.00 | 0.00 |
| CA(OH)2 | lb/hr | 0.00 | 0.00 | 0.00 | 200.00 | 0.00 | 0.00 | 200.00 | 21.94 |
| CASO3 | lb/hr | 0.00 | 0.00 | 0.00 | 0.00 | 0.00 | 0.00 | 0.00 | 28.87 |
| CASO4*2W | lb/hr | 0.00 | 0.00 | 0.00 | 0.00 | 0.00 | 0.00 | 0.00 | 372.38 |
| BIOMASS | lb/hr | 0.00 | 0.00 | 0.00 | 0.00 | 0.00 | 0.00 | 0.00 | 0.00 |
| CHAR | lb/hr | 0.00 | 0.00 | 0.00 | 0.00 | 0.00 | 0.00 | 0.00 | 0.00 |
| ASH | lb/hr | 0.00 | 0.00 | 0.00 | 0.00 | 0.00 | 0.00 | 0.00 | 0.00 |

TABLE 3

|  |  |  |  | Mass Fractions |  |  |  |  |
|---|---|---|---|---|---|---|---|---|
|  | 670 | 610 | 615 | 620 | 540 | 680 | 681 | 662 |
| H2O | 0.071873 | 0.071873 | 1.000000 | 0.089492 | 0.089608 | 0.810000 | 0.000000 | 0.000000 |
| H2 | 0.000000 | 0.000000 | 0.000000 | 0.000000 | 0.000000 | 0.000000 | 0.000000 | 0.000000 |
| N2 | 0.698017 | 0.698017 | 0.000000 | 0.683093 | 0.686281 | 0.000000 | 0.000000 | 0.000000 |
| O2 | 0.111180 | 0.111180 | 0.000000 | 0.108803 | 0.108924 | 0.000000 | 0.000000 | 0.000000 |
| AR | 0.011840 | 0.011840 | 0.000000 | 0.011586 | 0.011639 | 0.000000 | 0.000000 | 0.000000 |
| CO | 0.000000 | 0.000000 | 0.000000 | 0.000000 | 0.000000 | 0.000000 | 0.000000 | 0.000000 |
| CO2 | 0.105194 | 0.105194 | 0.000000 | 0.102945 | 0.103410 | 0.000000 | 0.000000 | 0.000000 |
| NH3 | 0.000000 | 0.000000 | 0.000000 | 0.000101 | 0.000050 | 0.190000 | 0.000000 | 0.000000 |
| CHN | 0.000000 | 0.000000 | 0.000000 | 0.000000 | 0.000000 | 0.000000 | 0.000000 | 0.000000 |
| H2S | 0.000000 | 0.000000 | 0.000000 | 0.000000 | 0.000000 | 0.000000 | 0.000000 | 0.000000 |
| COS | 0.000000 | 0.000000 | 0.000000 | 0.000000 | 0.000000 | 0.000000 | 0.000000 | 0.000000 |
| CL2 | 0.000000 | 0.000000 | 0.000000 | 0.000000 | 0.000000 | 0.000000 | 0.000000 | 0.000000 |
| HCL | 0.000000 | 0.000000 | 0.000000 | 0.000000 | 0.000000 | 0.000000 | 0.000000 | 0.000000 |
| NO | 0.000221 | 0.000221 | 0.000000 | 0.000216 | 0.000087 | 0.000000 | 0.000000 | 0.000000 |
| NO2 | 0.000003 | 0.000003 | 0.000000 | 0.000003 | 0.000000 | 0.000000 | 0.000000 | 0.000000 |
| SO2 | 0.001673 | 0.001673 | 0.000000 | 0.001637 | 0.000002 | 0.000000 | 0.000000 | 0.000000 |
| CH4 | 0.000000 | 0.000000 | 0.000000 | 0.000000 | 0.000000 | 0.000000 | 0.000000 | 0.000000 |
| C2H6 | 0.000000 | 0.000000 | 0.000000 | 0.000000 | 0.000000 | 0.000000 | 0.000000 | 0.000000 |
| C3H8 | 0.000000 | 0.000000 | 0.000000 | 0.000000 | 0.000000 | 0.000000 | 0.000000 | 0.000000 |
| C4+ | 0.000000 | 0.000000 | 0.000000 | 0.000000 | 0.000000 | 0.000000 | 0.000000 | 0.000000 |
| THERM66 | 0.000000 | 0.000000 | 0.000000 | 0.000000 | 0.000000 | 0.000000 | 0.000000 | 0.000000 |
| C | 0.000000 | 0.000000 | 0.000000 | 0.000000 | 0.000000 | 0.000000 | 0.000000 | 0.000000 |
| S | 0.000000 | 0.000000 | 0.000000 | 0.000000 | 0.000000 | 0.000000 | 0.000000 | 0.000000 |
| CA(OH)2 | 0.000000 | 0.000000 | 0.000000 | 0.002125 | 0.000000 | 0.000000 | 1.000000 | 0.051848 |
| CASO3 | 0.000000 | 0.000000 | 0.000000 | 0.000000 | 0.000000 | 0.000000 | 0.000000 | 0.068224 |
| CASO4*2W | 0.000000 | 0.000000 | 0.000000 | 0.000000 | 0.000000 | 0.000000 | 0.000000 | 0.879928 |
| BIOMASS | 0.000000 | 0.000000 | 0.000000 | 0.000000 | 0.000000 | 0.000000 | 0.000000 | 0.000000 |
| CHAR | 0.000000 | 0.000000 | 0.000000 | 0.000000 | 0.000000 | 0.000000 | 0.000000 | 0.000000 |
| ASH | 0.000000 | 0.000000 | 0.000000 | 0.000000 | 0.000000 | 0.000000 | 0.000000 | 0.000000 |

Although various features have been described with reference to the Figures, other features are possible. For example, various exemplary implementations in accordance with the present disclosure may provide a new process for PFAS elimination using a gasification system and a three-step process to remove and decompose PFAS from biosolids where the process is more effective than other means of control and lacks the potential environmental impacts of some other methods. In an illustrative example, a first step in decomposing the PFAS in wastewater biosolids may include feeding the biosolids to a gasification unit. After exiting the gasifier, the syngas may be combusted in a thermal oxidizer or similar device at a temperature of 1600-2600° F. and a residence time of 1-5 seconds. This exemplary step subsequent to gasification may serve to thermally decompose PFAS that remains in the gas after the gasification step. After exiting the thermal oxidizer, the flue gas may be cooled in a heat exchanger to provide heat and/or power to the plant or surrounding users. This cooled flue gas at 400-1200° F. may be mixed with hydrated lime as a polishing step in the decomposition of PFAS and to control emissions, such as sulfur oxides, from the plant.

In an illustrative example, an exemplary system for PFAS elimination in accordance with the present disclosure may comprise: a gasifier, a thermal oxidizer, and a dry sorbent injection system utilizing lime or hydrated lime with a catalyst impregnated filter.

In an illustrative example, an exemplary method for PFAS elimination in accordance with the present disclosure may comprise the steps of drying the PFAS containing feedstock to a moisture content suitable for gasification; feeding the PFAS containing feedstock to a gasifier wherein the PFAS is devolatilized from the feedstock and partially decomposed via various pathways; the syngas produced by the gasifier passes through a cyclone to remove the entrained solids from which PFAS have been removed; burning the syngas in a thermal oxidizer to complete the elimination of PFAS through thermal decomposition; and polishing any remaining PFAS by reaction with hydrated lime injected into the flue gas stream and then removed in a catalyst impregnated filter system.

The PFAS containing solids may be dried to less than 20% moisture.

The gasifier may operate at 900-1800° F.

Lime or limestone or dolomite may be added to the gasifier bed to enhance PFAS decomposition.

The syngas exiting the gasifier may have the entrained solids removed via a cyclone or other separation device.

The syngas may be burned in a thermal oxidizer or similar combustion device at a temperature of 1600-2600° F.

The gas residence time in the thermal oxidizer may be 1-5 seconds.

The flue gas from the thermal oxidizer may be mixed with lime at a temperature of 400-1200° F. as a polishing step.

The spent sorbent may be removed via a filter system comprising a unit containing filter elements on which solids are filtered and collected, which is periodically cleaned using a reverse flow of air or other gases, and which has a system for conveying the solids from the filters to a storage unit.

The filter system may use a catalyst impregnated filter element such as but not limited to a ceramic filter element with catalyst imbedded within the ceramic material.

PFAS elimination may be implemented by a PFAS elimination apparatus. The PFAS elimination apparatus may comprise a gasifier. The gasifier may be any gasifier known to those of ordinary skill in the art. The gasifier may be a downdraft gasifier or a fluidized bed gasifier. The gasifier may be configured to receive feedstock. The gasifier may be configured to receive feedstock fed into the gasifier. The apparatus may comprise a dryer. The dryer may be configured to be operated to dewater and dry feedstock. The feedstock may comprise wastewater biosolids. The gasifier may be operably coupled with the dryer. The feedstock may comprise PFAS. The gasifier may operate at temperatures of 900-1800° F. The gasifier may be configured to be operated to devolatilize the PFAS, liberate the PFAS from the solids, and decompose the PFAS. The gasifier may be configured to be operated to turn the feedstock into a low heating value synthesis gas.

The gasifier may be operably coupled with a cyclone. The cyclone may be configured to be operated to remove entrained particles from gas retained by the cyclone. The cyclone may be operably coupled with the gasifier to receive the syngas exiting the gasifier. The apparatus may comprise a thermal oxidizer or a device similar to a thermal oxidizer. The thermal oxidizer or similar device may be operably coupled with the gasifier. The thermal oxidizer or similar device may be operably coupled with the cyclone. The thermal oxidizer or similar device may be operably coupled with the gasifier to receive the syngas exiting from the gasifier. The thermal oxidizer or similar device may be operably coupled with the cyclone to receive the syngas exiting from the gasifier. The thermal oxidizer or similar device may be configured to combust the synthesis gas. The thermal oxidizer or similar device may be configured to combust the syngas at temperatures of 1600-2600° F. The thermal oxidizer or similar device may be configured to combust the syngas at a temperature higher than the gasifier operating temperature. The thermal oxidizer or similar device may be configured to combust the syngas for a residence time of 1-5 seconds. The thermal oxidizer or similar device may be configured to be operated to thermally decompose PFAS remaining in the syngas after gasification.

The apparatus may comprise a heat exchanger. The heat exchanger may be operably coupled with the thermal oxidizer. The heat exchanger may be configured to receive flue gas from the syngas combustion in the thermal oxidizer or similar device. The heat exchanger may be configured to cool flue gas heated by the syngas combustion in the thermal oxidizer or similar device. The heat exchanger or similar device may be configured to be operated to cool the heated flue gas. The heat exchanger or similar device may be configured to be operated to cool the heated flue gas exiting the thermal oxidizer or similar device. The heat exchanger may be configured to be operated to recover heat based on cooling the heated flue gas exiting the thermal oxidizer or similar device, to provide heat and/or power to the plant or surrounding devices or systems. The heat exchanger may be configured to be operated to cool the heated flue gas to temperatures of 400-1200° F.

The apparatus may be configured to inject the cooled flue gas passing through the heat exchanger with hydrated lime. The apparatus may be configured to be operably coupled with an exhaust stack to release the cooled flue gas through the exhaust stack. The apparatus may comprise a filter. The filter may be operably coupled with the heat exchanger to remove spent lime from the gas stream exiting the heat exchanger. The apparatus may be configured to periodically clean the filter with a pulse of air directed backwards through the filter relative to the direction of the gas stream exiting the heat exchanger.

The apparatus may comprise a mixing chamber configured to be coupled with the heat exchanger to receive the cooled flue gas. The mixing chamber may comprise a duct operably coupled with the heat exchanger. The mixing chamber may be configured to be operated to receive cooled flue gas at temperatures of 400-1200° F. The mixing chamber may be configured to be operated to mix the cooled flue gas with hydrated lime injected into the mixing chamber. The hydrated lime may be filtered out of the flue gas. The mixing chamber may be configured to be fluidly coupled with the exhaust stack to release the cooled flue gas after the lime is filtered out of the flue gas. The mixing chamber may be configured to be operated to mix the cooled flue gas with hydrated lime as a polishing step in the decomposition of PFAS and to control emissions, such as sulfur oxides, from the plant.

The apparatus may comprise piping, ducts, pumps, valves, conduit, sensors, and wiring configured to implement the described functions. The apparatus may comprise a control system. The control system may be operably coupled with the piping, ducts, pumps, valves, conduit, sensors, and wiring to implement the described functions. The control system may comprise an algorithmic controller. The control system may comprise a processor. The control system may comprise a memory configured to be operably coupled with the processor. The memory may be operably coupled with the processor. The memory may comprise encoded processor executable program instructions and data, wherein the instructions and data jointly program and configure the apparatus, that the instructions, when executed by the processor, cause the apparatus to perform operations implementing the described functions.

PFAS elimination may be implemented by a PFAS elimination process. The PFAS elimination process may comprise gasifying, by a gasifier, feedstock comprising PFAS. The gasifier may be any gasifier known to those of ordinary skill in the art. The gasifier may be a downdraft gasifier or a fluidized bed gasifier. Gasifying feedstock may comprise feeding feedstock comprising PFAS into the gasifier. The feedstock may comprise wastewater biosolids. The process may comprise drying, by a dryer, feedstock comprising wastewater biosolids. The dryer may be operably coupled with the gasifier to feed feedstock dried by the dryer to the gasifier. The process may comprise configuring the gasifier to operate at temperatures of 900-1800° F. The process may comprise configuring and operating the gasifier to devolatilize the PFAS, liberate the PFAS from the solids, and decompose the PFAS. The process may comprise configuring and operating the gasifier to turn the feedstock into a low heating value syngas.

The process may comprise removing, by a cyclone, entrained particles from syngas retained by the cyclone. The cyclone may be operably coupled with the gasifier to receive the syngas exiting the gasifier. The process may comprise combusting, by a thermal oxidizer, the syngas received from the gasifier. The thermal oxidizer may be operably coupled with the gasifier to receive the syngas exiting the gasifier. The thermal oxidizer may be operably coupled with the cyclone to receive the syngas dis-entrained of particulate matter by the cyclone. The process may comprise configuring and operating the thermal oxidizer to combust the syngas at temperatures of 1600-2600° F. The process may comprise configuring and operating the thermal oxidizer or similar device to combust the syngas at a temperature higher than the gasifier operating temperature. The process may comprise configuring and operating the thermal oxidizer or similar device to combust the syngas at a residence time of 1-5 seconds. The process may comprise configuring and operating the thermal oxidizer to thermally decompose PFAS remaining in the syngas after gasification.

The process may comprise cooling, by a heat exchanger operably coupled with the thermal oxidizer, flue gas heated by the syngas combustion in the thermal oxidizer. The process may comprise configuring and operating the heat exchanger to cool the heated flue gas to temperatures of 400-1200° F. The process may comprise injecting the cooled flue gas passing through the heat exchanger with hydrated lime. The process may comprise mixing, in a mixing chamber operably coupled with the heat exchanger to receive cooled flue gas from the heat exchanger, hydrated lime injected into the mixing chamber with the cooled flue gas. The process may comprise filtering, by a filter operably coupled with the heat exchanger, the gas stream exiting the heat exchanger. The process may comprise configuring and operating the filter to remove spent lime from the gas stream exiting the heat exchanger. The process may comprise periodically cleaning the filter with a pulse of air directed backwards through the filter relative to the direction of the gas stream exiting the heat exchanger. The process may comprise releasing, by an exhaust stack operably coupled with the heat exchanger, the cooled flue gas.

The process may comprise configuring piping, ducts, pumps, valves, conduit, sensors, and wiring to implement the described steps. The process may comprise configuring a control system operably coupled with the piping, ducts, pumps, valves, conduit, sensors, and wiring to implement by the control system one or more of the described steps. The described steps may be implemented by an algorithmic controller. The control system may comprise a processor. The control system may comprise a memory configured to be operably coupled with the processor. The memory may be operably coupled with the processor. The memory may comprise encoded processor executable program instructions and data, wherein the instructions and data jointly program and configure the apparatus, that the instructions, when executed by the processor, cause the apparatus to perform operations implementing one or more described step.

Various implementations may achieve one or more technical effect. For example, some implementations may improve PFAS decomposition rates. This facilitation may be a result of burning syngas at higher temperatures, rather than directly burning solid feedstock. For example, burning syngas at higher temperatures instead of directly burning solid feedstock may avoid negative environmental consequences that are possible with incineration. In some implementations, PFAS elimination may be more effective than gasification. Such improved PFAS elimination effectiveness may be a result of combusting syngas in a thermal oxidizer for a sufficient residence time at higher temperatures to thermally decompose more stable PFAS compounds. Various implementations may increase the energy efficiency of PFAS elimination. Such increased energy efficiency may be a result of recovering heat from flue gas heated by syngas combustion and providing the recovered heat to the surrounding plant. Some implementations may reduce PFAS elimination emissions. This facilitation may be a result of mixing cooled flue gas with hydrated lime, to enhance PFAS decomposition and control emissions of harmful substances such as sulfur oxides from the plant.

An exemplary PFAS elimination implementation in accordance with the present disclosure may eliminate PFAS through an exemplary three-step process. In an illustrative example, an exemplary first step in decomposing the PFAS in the biosolids may be to feed the biosolids to a gasification unit. In an illustrative example, the gasifier may operate at temperatures from 900-1800° F. The gasifier acts to devolatilize the PFAS, liberate the PFAS from the solids, and decompose the PFAS. The gasifier turns the feedstock into a low heating value syngas. After exiting the gasifier, the syngas may be combusted in a thermal oxidizer or similar device at a temperature of 1600-2600° F. and a residence time of 1-5 seconds. This exemplary second step may thermally decompose PFAS that may remain in the syngas after the gasification step. Exiting the thermal oxidizer, in an exemplary third step, the flue gas may be cooled in a heat exchanger to provide heat and/or power to the plant or surrounding users. This cooled flue gas at 400-1200° F. may be mixed with hydrated lime as a polishing step in the decomposition of PFAS, and to control emissions, such as sulfur oxides, from the plant.

A PFAS elimination implementation in accordance with the present disclosure may provide a system or a method to eliminate PFAS in wastewater biosolids and other feedstocks using gasification, combustion in a thermal oxidizer, and reactions with lime using an exemplary three-step process to decompose the PFAS.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, i.e., as designating one, at least one, at least two, each or all of the respective elements. Similarly, the term "any" may be understood as designating any collection(s) of the respective elements, i.e., as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of" In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. One of ordinary skill in the art would appreciate that an exemplary system appropriate for use with implementation in accordance with the present application may generally include a control system configured with one or more of a Central processing Unit (CPU) (for e, Random Access Memory (RAM), a storage medium (for example, hard disk drive, solid state drive, flash memory, cloud storage), an operating system (OS), one or more application software, a display element, one or more input/output devices/means, or one or more input/output devices/means. The control system may be an algorithmic controller implementing one or more algorithm. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general-purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code encoded therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code encoded by a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

The respective reference numbers and descriptions of the elements depicted by the Drawings are summarized as follows.

100 system
105 material
110 conveyor
115 gasifier feed bin
120 gasifier
135 cyclone
140 thermal oxidizer
145 heat exchanger 150 duct
155 filter unit
156 catalyst impregnated filter element
160 exhaust
200 process
205 biosolids storage bin
210 live bottom
215 feed screw
220 dryer
305 filter inlet
310 filter outlet
315 air manifold
320 waste hopper
325 airlock waste exit
505 injector skids
505A moisture injector
505B ammonia injector
505C sorbent injector
510 EC waste
670 data point input to heat exchanger 145
610 data point output from heat exchanger 145
615 moisture injector data point
680 ammonia injector data point
681 sorbent injector data point
620 data point input to filter unit
540 data point output from filter unit and
682 Data Point to EC waste unit A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
a source of feedstock comprising poly and perfluoroalkyl substances (PFAS);
a gasifier operably coupled with the source of feedstock to receive the feedstock, configured to gasify and devolatilize PFAS in the feedstock, liberate PFAS from solids in the feedstock, decompose the PFAS liberated from solids in the feedstock, and emit syngas produced based on gasifying the feedstock;
a thermal oxidizer operably coupled with the gasifier to receive the syngas, wherein the thermal oxidizer is configured to combust the syngas and emit heated flue gas produced based on combusting the syngas;
a heat exchanger, operably coupled with the thermal oxidizer to receive the heated flue gas, wherein the heat exchanger is configured to cool the heated flue gas and emit a cooled flue gas into a duct;
a moisture injector operably coupled to the duct to inject a moisture into the cooled flue gas stream;
an ammonia injector operably coupled to the duct to inject ammonia into the cooled flue gas stream, wherein the ammonia is configured to react with a first plurality of substances;
a sorbent injector operably coupled to the duct to inject a sorbent into the cooled flue gas stream wherein the sorbent is configured to react with a second plurality of substances; and
a filter unit comprising at least one filter element, said filter unit operably coupled to the duct to filter the cooled flue gas stream exiting the duct, wherein a temperature of the at least one filter element is controlled through evaporative cooling in the duct, effected by at least one of said injectors.

2. The apparatus of claim 1, wherein the moisture injector operably couples to the duct at a point before the sorbent injector and at a point before the ammonia injector.

3. The apparatus of claim 1, wherein the ammonia injector operably couples to the duct at a point after the moisture injector.

4. The apparatus of claim 1, wherein the sorbent injector operably couples to the duct at a point after the ammonia injector.

5. The apparatus of claim 1, wherein the sorbent injector provides a source of hydrated lime operably coupled to the heat exchanger, wherein the hydrated lime is injected into the filter unit at an exit of the heat exchanger.

6. The apparatus of claim 1, wherein the apparatus further comprises a waste unit operably coupled to the filter unit to collect spent sorbent from the filter unit.

7. The apparatus of claim 1, wherein the sorbent is hydrated lime comprising a dry powder.

8. The apparatus of claim 1, wherein the moisture injector further comprises spray nozzles operable to atomize the moisture.

9. The apparatus of claim 1, wherein the moisture is water.

10. The apparatus of claim 1, wherein the moisture injector is controllable to operate at a temperature of substantially 720° F. to 800° F. input to the filter unit.

11. The apparatus of claim 1, wherein the ammonia is aqueous ammonia.

12. The apparatus of claim 11, wherein the aqueous ammonia is a solution comprising substantially 19% ammonia.

13. The apparatus of claim 11, wherein the filter unit comprises a ceramic filter impregnated with a racking catalyst.

14. The apparatus of claim 1, wherein the apparatus further comprises a mass flow to the heat exchanger of substantially 92.125 pounds per hour comprising a constant injection of substantially 50 pounds per hour of ammonia and a constant injection of substantially 200 pounds per hour of the sorbent.

15. The apparatus of claim 1, wherein the filter unit is a pollution control unit that removes emissions comprising NO2, SO2 or particulates.

16. The apparatus of claim 1, wherein at least one filter element further comprises a filter surface configured to use lime as a filtration aid to capture and remove particulates on the filter surface.

17. A method comprising:
providing feedstock comprising poly and perfluoroalkyl substances (PFAS) to a gasifier;
in the gasifier, devitalizing PFAS in the feedstock, liberating PFAS from solids in the feedstock, decomposing liberated PFAS, gasifying the solids to produce syngas, and hydrogenating the syngas;
combusting the syngas in a thermal oxidizer to emit a heated flue gas;
cooling the heated flue gas using a heat exchanger;
emitting a cooled flue gas exiting the heat exchanger to a duct;
injecting moisture, ammonia, and sorbent into the cooled flue gas in the duct;
removing the sorbent from the cooled flue gas using a filter to produce a gas; and
controlling temperature of the cooled flue gas entering the filter through evaporate cooling via the injecting step.

18. The method of claim 17, wherein the feedstock is solid.

19. The method of claim 17, wherein the feedstock is solid and gaseous.

20. The method of claim 17, wherein hydrogenating breaks up bonds of long chain PFAS.

21. The method of claim 20, wherein long chain PFAS comprises carbon bonds of 20 to 30 atoms.

\* \* \* \* \*